(12) United States Patent
Zhang

(10) Patent No.: US 11,483,863 B2
(45) Date of Patent: Oct. 25, 2022

(54) METHOD AND DEVICE FOR WIRELESS COMMUNICATION IN UE AND BASE STATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 100 days.

(21) Appl. No.: 16/932,835

(22) Filed: Jul. 20, 2020

(65) Prior Publication Data
US 2020/0367285 A1 Nov. 19, 2020

Related U.S. Application Data

(63) Continuation of application No. PCT/CN2018/073966, filed on Jan. 24, 2018.

(51) Int. Cl.
*H04W 74/08* (2009.01)
*H04L 5/00* (2006.01)
(Continued)

(52) U.S. Cl.
CPC ....... *H04W 74/0808* (2013.01); *H04L 5/0048* (2013.01); *H04W 16/14* (2013.01);
(Continued)

(58) Field of Classification Search
CPC ..... H04L 5/005; H04L 1/0003; H04L 1/1819; H04L 5/0082; H04L 5/0053;
(Continued)

(56) References Cited

U.S. PATENT DOCUMENTS

2012/0179638 A1* 7/2012 Hsieh .................. G06N 20/00
  706/46
2013/0111538 A1* 5/2013 Endo ................ H04N 21/44209
  725/116
(Continued)

FOREIGN PATENT DOCUMENTS

| CN | 107113046 A | 8/2017 |
| CN | 107439048 A | 12/2017 |
| CN | 107534991 A | 1/2018 |

OTHER PUBLICATIONS

ISR received in application No. PCT/CN2018/073966 dated Sep. 27, 2018.
ZTE"Operation on high frequency of unlicensed spectrum in NR, R1-1609802" 3GPP TSG RAN WG1 Meeting #86Bis, Oct. 14, 2016 (Oct. 14, 2016).
Office Action received in Chinese patent application No. 201880083622. 1, dated Jun. 6, 2022.
(Continued)

*Primary Examiner* — Dady Chery

(57) ABSTRACT

The present disclosure provides a method and a device in a User Equipment (UE) and a base station used for wireless communications. The UE receives a first radio signal, receives first information, and then performs a first access detection for determining whether an uplink transmission is performed at a first time on a first sub-band; if so, transmits a second radio signal by a second antenna port group at the first time on the first sub-band; if not, drops transmission of a second radio signal at the first time on the first sub-band; wherein a first receiving parameter group is used for receiving the first radio signal, and a second receiving parameter group is used for generating the second antenna port group. The above method improves uplink channel access chance, thus increasing the system capacity.

12 Claims, 20 Drawing Sheets

(51) Int. Cl.
  *H04W 16/14*  (2009.01)
  *H04W 72/04*  (2009.01)
  *H04W 72/08*  (2009.01)
(52) U.S. Cl.
  CPC ..... *H04W 72/042* (2013.01); *H04W 72/0446* (2013.01); *H04W 72/0453* (2013.01); *H04W 72/085* (2013.01)
(58) Field of Classification Search
  CPC ... H04L 1/0025; H04L 1/1822; H04L 5/0023; H04L 5/0094; H04B 7/0408; H04B 7/0413; H04B 7/06; H04B 7/0617; H04B 7/0456; H04W 88/02
  See application file for complete search history.

(56) References Cited

U.S. PATENT DOCUMENTS

| | | | |
|---|---|---|---|
| 2016/0069980 A1* | 3/2016 | Nishikawa | G01S 3/14 |
| | | | 342/351 |
| 2016/0192395 A1* | 6/2016 | Yoo | H04B 7/0874 |
| | | | 370/329 |
| 2017/0006593 A1 | 1/2017 | Liu | |
| 2017/0334670 A1 | 11/2017 | Omori | |

OTHER PUBLICATIONS

Search Report received in Chinese patent application No. 201880083622.1, dated May 30, 2022.

* cited by examiner

First information → First antenna port group and K1−1 antenna port group(s) among K antenna port groups

FIG. 12

First information

First threshold

FIG. 13A

First information

First antenna port group and first threshold

FIG. 13B

First information

First antenna port group, K antenna port groups and first threshold

FIG. 13C

METHOD AND DEVICE FOR WIRELESS COMMUNICATION IN UE AND BASE STATION

CROSS REFERENCE TO RELATED APPLICATIONS

This application is a continuation of International Application No. PCT/CN2018/073966, filed Jan. 24, 2018, claims the priority benefit of International Patent Application No. PCT/CN2018/073966, filed on Jan. 24, 2018, the full disclosure of which is incorporated herein by reference.

BACKGROUND

Technical Field

The present disclosure relates to transmission methods and devices in wireless communication systems, and in particular to a communication method and device that support data transmissions on Unlicensed Spectrum.

Related Art

In traditional 3rd Generation Partner Project (3GPP) Long-term Evolution (LTE) systems, data transmissions can only be performed on licensed spectrum, however, as traffic enlarges rapidly, especially in some cities and regions, licensed spectrum may hardly meet the requirements of increasing traffic. Therefore, communications on unlicensed spectrum in Release 13 and Release 14 is introduced into cellular systems and used for downlink and uplink data transmissions. In order to guarantee the compatibility with other access technologies on unlicensed spectrum, Listen Before Talk (LBT) is adopted by Licensed Assisted Access (LAA) to avoid interference caused by multiple transmitters occupying same frequency resources simultaneously. The transmitter of the LTE system adopts a quasi-omnidirectional antenna to perform LBT.

Currently, discussion on 5G New Radio Access Technology (NR) is in progress, among which Massive Multi-Input Multi-Output (MIMO) becomes a hot topic when studying next generation mobile communications. For the massive MIMO, multiple antennas based on beamforming form a narrow beam which points to a particular direction to improve communication quality. When considering coverage characteristics brought by beamforming, the conventional LAA technology needs to be reconsidered, such as radio signal transmissions based on LBT.

SUMMARY

The inventor has found through researches that in NR system, beamforming will be used on a large scale. A key issue needs to be solved is that how to improve channel access chance and increase system capacity in case of ensuring that same frequency interference among multiple transmitters is avoided.

In view of the above problem, the present disclosure provides a solution. It should be noted that in the case of no conflict, the embodiments of the present disclosure and the features in the embodiments may be combined with each other arbitrarily.

The present disclosure discloses a method in a User Equipment (UE) for wireless communications, comprising:

receiving a first radio signal, the first radio signal being transmitted by a first antenna port group;

receiving first information; and performing a first access detection to determine whether an uplink transmission is performed at a first time on a first sub-band; if so, transmitting a second radio signal by a second antenna port group at the first time on the first sub-band; if not, dropping transmission of a second radio signal at the first time on the first sub-band;

wherein the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one embodiment, a problem needed to be solved in the present disclosure is that: in NR system, due to a radio signal is transmitted with the adoption of massive MIMO technology, interference conditions in different beam directions will be very different, and LBT based on beams can more truly reflect an interference condition in a specific beam direction. In Grant free uplink transmissions, uplink traffic of UE is usually small, and downlink reception is limited. The UE usually performs a Grant free uplink transmission with a pre-allocated beam in time-frequency resources reserved by the base station. Generally, an update on a pre-allocated beam is slow, so the beam cannot be adjusted quickly with the change of channel or interference environment, which may affect channel access chance or uplink transmissions. Therefore, how to improve channel access chance and increase system capacity is a key issue that needs to be solved.

In one embodiment, the above method is essential in that first receiving parameter space corresponds to a limited beam scope, which comprises multiple beams. The UE can monitor a channel within this beam scope, and if LBT detection result based on one of the beams is that the channel is idle, the UE can use this beam to perform an uplink radio signal transmission. The above method is advantageous in that, compared with using a pre-configured beam, it improves uplink channel access chance, so as to increase the system capacity.

According to one aspect of the present disclosure, the above method is characterized in comprising:

determining the second receiving parameter group out of K1 receiving parameter groups, K1 being a positive integer greater than 1;

wherein each of the K1 receiving parameter groups belongs to the first receiving parameter space.

According to one aspect of the present disclosure, the above method is characterized in comprising:

receiving K radio signals, K being a positive integer greater than 1;

wherein the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups.

According to one aspect of the present disclosure, the above method is characterized in that in the first receiving parameter space, the UE determines the K1 receiving parameter groups by itself.

According to one aspect of the present disclosure, the above method is characterized in that the first information is used for determining a first threshold, and the first receiving parameter group and the first threshold are used together for determining the first receiving parameter space.

According to one aspect of the present disclosure, the above method is characterized in that a correlation coefficient between any receiving parameter group in the first receiving parameter space and the first receiving parameter group is not lower than the first threshold.

According to one aspect of the present disclosure, the above method is characterized in that a deviation between a first reference receiving quality and a receiving quality obtained by adopting any receiving parameter group in the first receiving parameter space to receive a downlink radio signal is not greater than the first threshold, the first reference receiving quality being a receiving quality obtained by adopting the first receiving parameter group to receive the downlink radio signal.

According to one aspect of the present disclosure, the above method is characterized in that a deviation between a second reference receiving quality and a given receiving quality is not greater than the first threshold, the second reference receiving quality is a receiving quality obtained by adopting a reference transmitting parameter group to transmit an uplink radio signal, and the given receiving quality is a receiving quality obtained by adopting a given transmitting parameter group to transmit the uplink radio signal; the first receiving parameter group is used for generating the reference transmitting parameter group, and any receiving parameter group in the first receiving parameter space is used for generating the given transmitting parameter group.

The present disclosure discloses a method in a base station for wireless communications, comprising:
transmitting a first radio signal, the first radio signal being transmitted by a first antenna port group;
transmitting first information; and
monitoring a second radio signal at a first time on a first sub-band;
wherein a first access detection is used for determining whether an uplink transmission is performed at the first time on the first sub-band; if so, transmitting the second radio signal by a second antenna port group at the first time on the first sub-band; if not, dropping transmission of the second radio signal at the first time on the first sub-band; the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

According to one aspect of the present disclosure, the above method is characterized in that a receiver of the first information determine the second receiving parameter group from K1 receiving parameter groups, K1 being a positive integer greater than 1. wherein the K1 receiving parameter groups all belong to the first receiving parameter space.

According to one aspect of the present disclosure, the above method is characterized in comprising:
transmitting K radio signals, K being a positive integer greater than 1;
wherein the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups.

According to one aspect of the present disclosure, the above method is characterized in that in the first receiving parameter space, a receiver of the first information determines the K1 receiving parameter groups by itself.

According to one aspect of the present disclosure, the above method is characterized in that the first information is used for determining a first threshold, and the first receiving parameter group and the first threshold are used together for determining the first receiving parameter space.

According to one aspect of the present disclosure, the above method is characterized in that a correlation coefficient between any receiving parameter group in the first receiving parameter space and the first receiving parameter group is not lower than the first threshold.

According to one aspect of the present disclosure, the above method is characterized in that a deviation between a first reference receiving quality and a receiving quality obtained by adopting any receiving parameter group in the first receiving parameter space to receive a downlink radio signal is not greater than the first threshold, the first reference receiving quality being a receiving quality obtained by adopting the first receiving parameter group to receive the downlink radio signal.

According to one aspect of the present disclosure, the above method is characterized in that a deviation between a second reference receiving quality and a given receiving quality is not greater than the first threshold, the second reference receiving quality is a receiving quality obtained by adopting a reference transmitting parameter group to transmit an uplink radio signal, and the given receiving quality is a receiving quality obtained by adopting a given transmitting parameter group to transmit the uplink radio signal; the first receiving parameter group is used for generating the reference transmitting parameter group, and any receiving parameter group in the first receiving parameter space is used for generating the given transmitting parameter group.

The present disclosure discloses a UE used for wireless communications, comprising:
a first receiver, receiving a first radio signal, the first radio signal being transmitted by a first antenna port group; receiving first information; and
a first transceiver, performing a first access detection to determine whether an uplink transmission is performed at a first time on a first sub-band; if so, transmitting a second radio signal by a second antenna port group at the first time on the first sub-band; if not, dropping transmission of a second radio signal at the first time on the first sub-band;
wherein the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one embodiment, the above UE is characterized in that the first transceiver also determines the second receiving parameter group out of K1 receiving parameter groups, K1 being a positive integer greater than 1; wherein each of the K1 receiving parameter groups belongs to the first receiving parameter space.

In one embodiment, the above UE is characterized in that the first receiver also receives K radio signals, K being a positive integer greater than 1; wherein the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups.

In one embodiment, the above UE is characterized in that in the first receiving parameter space, the UE determines the K1 receiving parameter groups by itself.

In one embodiment, the above UE is characterized in that the first information is used for determining a first threshold, and the first receiving parameter group and the first threshold are used together for determining the first receiving parameter space.

In one embodiment, the above UE is characterized in that a correlation coefficient between any receiving parameter group in the first receiving parameter space and the first receiving parameter group is not lower than the first threshold.

In one embodiment, the above UE is characterized in that a deviation between a first reference receiving quality and a receiving quality obtained by adopting any receiving parameter group in the first receiving parameter space to receive a downlink radio signal is not greater than the first threshold, the first reference receiving quality being the receiving quality obtained by adopting the first receiving parameter group to receive the downlink radio signal.

In one embodiment, the above UE is characterized in that a deviation between a second reference receiving quality and a given receiving quality is not greater than the first threshold, the second reference receiving quality is a receiving quality obtained by adopting a reference transmitting parameter group to transmit an uplink radio signal, and the given receiving quality is a receiving quality obtained by adopting a given transmitting parameter group to transmit the uplink radio signal; the first receiving parameter group is used for generating the reference transmitting parameter group, and any receiving parameter group in the first receiving parameter space is used for generating the given transmitting parameter group.

The present disclosure discloses a base station used for wireless communications, comprising:

a second transmitter, transmitting a first radio signal, the first radio signal being transmitted by a first antenna port group; transmitting first information; and a second receiver, monitoring a second radio signal at a first time on a first sub-band;

wherein a first access detection is used for determining whether an uplink transmission is performed at the first time on the first sub-band; if so, the second radio signal is transmitted by a second antenna port group at the first time on the first sub-band; if not, transmission of the second radio signal is dropped at the first time on the first sub-band; the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one embodiment, the above base station is characterized in that a receiver of the first information determines the second receiving parameter group out of K1 receiving parameter groups, K1 being a positive integer greater than 1; wherein each of the K1 receiving parameter groups belongs to the first receiving parameter space.

In one embodiment, the above base station is characterized in that the second transmitter also transmits K radio signals, K being a positive integer greater than 1; wherein the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups.

In one embodiment, the above base station is characterized in that in the first receiving parameter space, a receiver of the first information determines the K1 receiving parameter groups by itself.

In one embodiment, the above base station is characterized in that the first information is used for determining a first threshold, and the first receiving parameter group and the first threshold are jointly used for determining the first receiving parameter space.

In one embodiment, the above base station is characterized in that a correlation coefficient between any receiving parameter group in the first receiving parameter space and the first receiving parameter group is not lower than the first threshold.

In one embodiment, the above base station is characterized in that a deviation between a first reference receiving quality and a receiving quality obtained by adopting any receiving parameter group in the first receiving parameter space to receive a downlink radio signal is not greater than the first threshold, the first reference receiving quality being a receiving quality obtained by adopting the first receiving parameter group to receive the downlink radio signal.

In one embodiment, the above base station is characterized in that a deviation between a second reference receiving quality and a given receiving quality is not greater than the first threshold, the second reference receiving quality is a receiving quality obtained by adopting a reference transmitting parameter group to transmit an uplink radio signal, and the given receiving quality is a receiving quality obtained by adopting a given transmitting parameter group to transmit the uplink radio signal; the first receiving parameter group is used for generating the reference transmitting parameter group, and any receiving parameter group in the first receiving parameter space is used for generating the given transmitting parameter group.

In one embodiment, the present disclosure has the following advantages over conventional schemes:

The UE monitors a channel within a limited beam scope, which comprises multiple beams. If LBT detection result based on one of the beams is that the channel is idle, the UE can use this beam to perform an uplink radio signal transmission. Compared with using a pre-configured beam, it improves uplink channel access chance and increase system capacity.

Multiple beams comprised in the beam scope can be specified by the base station, and can be determined by the UE itself based on abilities according to a given rule, the given rule determines the beam scope according to a beam and a threshold specified by the base station.

In Grant free uplink transmissions, problems of low channel access chance or poor uplink transmission quality incurred by slow update of pre-allocated beams and inability to perform quick adjustment of beams with the change of channel or interference environment are solved.

BRIEF DESCRIPTION OF THE DRAWINGS

Other features, objects and advantages of the present disclosure will become more apparent from the detailed description of non-restrictive embodiments taken in conjunction with the following drawings:

FIG. 12 illustrates a schematic diagram of first information according to one embodiment of the present disclosure;

FIGS. 13A-13C illustrate schematic diagrams of first information according to another embodiment of the present disclosure respectively;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
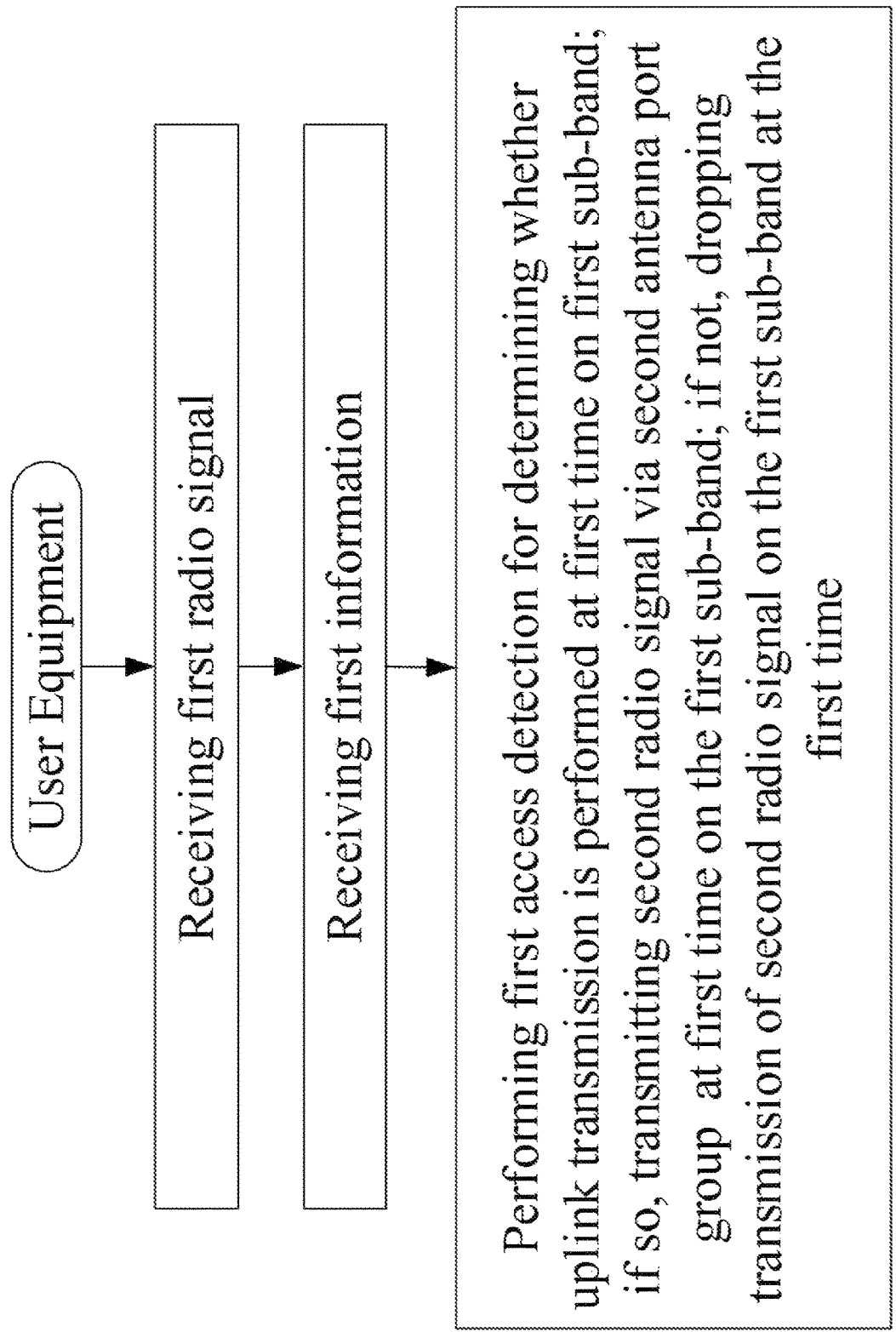
FIG. 1 illustrates a flowchart of a first radio signal, first information, a first access detection and a second radio signal according to one embodiment of the present disclosure.

Embodiment 1 illustrates a flowchart of a first radio signal, first information, a first access detection and a second radio signal, as shown in FIG. 1.

In Embodiment 1, the UE in the present disclosure receives a first radio signal, the first radio signal being transmitted by a first antenna port group; receives first information; and performs a first access detection to determine whether an uplink transmission is performed at a first time on a first sub-band; if so, transmits a second radio signal by a second antenna port group at the first time on the first sub-band; if not, drops transmission of a second radio signal at the first time on the first sub-band; wherein the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one embodiment, the first radio signal comprises one or more of a synchronization signal, DeModulation Reference Signals (DMRS), a Channel State Information-Reference Signal (CSI-RS), a fine time/frequency Tracking Reference Signals (TRS), and Phase error Tracking Reference Signals (PRTS).

In one embodiment, the first radio signal comprises a synchronization signal.

In one embodiment, the first radio signal comprises a CSI-RS.

In one embodiment, the first radio signal comprises a synchronization signal and a CSI-RS.

In one embodiment, the synchronization signal belongs to a Synchronization Signal Block (SSB).

In one embodiment, the synchronization signal comprises at least one of a Primary Synchronization Signal (PSS) and a Secondary Synchronization Signal (SSS).

In one embodiment, the synchronization comprises a PSS and a SSS.

In one embodiment, the first radio signal comprises DMRS and data.

In one embodiment, the first radio signal comprises DMRS.

In one embodiment, the first radio signal is transmitted on the first sub-band.

In one embodiment, a transmission band of the first radio signal comprises the first sub-band.

In one embodiment, the first sub-band comprises a positive integer number of Physical Resource Block(s) (PRB).

In one embodiment, the first sub-band comprises a positive integer number of consecutive PRBs.

In one embodiment, the first sub-band comprises a positive integer number of Resource Block(s) (RB).

In one embodiment, the first sub-band comprises a positive integer number of consecutive RBs.

In one embodiment, the first sub-band comprises a positive integer number of consecutive subcarriers.

In one embodiment, a number of consecutive subcarriers comprised in the first sub-band is equal to a positive integral multiple of 12.

In one embodiment, the first sub-band is deployed on the unlicensed spectrum.

In one embodiment, the first sub-band comprises a Carrier.

In one embodiment, the first sub-band comprises at least one Carrier.

In one embodiment, the first sub-band belongs to a Carrier.

In one embodiment, the first sub-band comprises a Bandwidth Part (BWP).

In one embodiment, the first radio signal is transmitted on a downlink physical-layer data channel (i.e., a downlink channel can be used for bearing physical-layer data).

In one subembodiment of the above embodiment, the downlink physical-layer data channel is a Physical Downlink Shared CHannel (PDSCH).

In one subembodiment of the above embodiment, the downlink physical-layer data channel is a short PDSCH (sPDSCH).

In one subembodiment of the above embodiment, the downlink physical-layer data channel is a New Radio PDSCH (NR-PDSCH).

In one subembodiment of the above embodiment, the downlink physical-layer data channel is a Narrow Band PDSCH (NB-PDSCH).

In one embodiment, a transmission channel corresponding to the first radio signal is a Downlink Shared Channel (DL-SCH).

In one embodiment, the second radio signal comprises at least one of data, control information or a reference signal.

In one embodiment, the second radio signal comprises data.

In one embodiment, the second radio signal comprises control information.

In one embodiment, the second radio signal comprises a reference signal.

In one embodiment, the second radio signal comprises data, control information and a reference signal.

In one embodiment, the second radio signal comprises data and control information.

In one embodiment, the second radio signal comprises control information and a reference signal.

In one embodiment, the second radio signal comprises data and a reference signal.

In one embodiment, the data is uplink data.

In one embodiment, the control information is Uplink Control Information (UCI).

In one embodiment, the control information comprises at least one of Hybrid Automatic Repeat reQuest feedback and CSI.

In one subembodiment of the above embodiment, the CSI comprises at least one of a Rank indication (RI), a Precoding matrix indicator (PMI), a Channel quality indicator (CQI) or a Csi-reference signal Resource Indicator (CRI).

In one embodiment, the reference signal comprises one or more of DMRS, a Sounding Reference Signal (SRS) and Phase error Tracking Reference Signals (PTRS).

In one embodiment, the second radio signal is transmitted on an uplink random access channel.

In one subembodiment of the present disclosure, the uplink random access channel is a Physical Random Access Channel (PRACH).

In one embodiment, a transmission channel corresponding to the second radio signal is an Uplink Shared Channel (UL-SCH).

In one embodiment, the second radio signal is transmitted on an uplink physical-layer data channel (i.e., an uplink channel can be used for bearing physical layer data).

In one subembodiment of the above embodiment, the uplink physical layer data channel is a Physical Uplink Shared CHannel (PUSCH).

In one subembodiment, the uplink physical layer data channel is a short Physical Uplink Shared Channel (sPUSCH).

In one subembodiment of the above embodiment, the uplink physical layer data channel is a New Radio PUSCH (NR-PUSCH).

In one subembodiment of the above embodiment, the uplink physical layer data channel is a Narrow Band PUSCH (NB-PUSCH).

In one embodiment, the first radio signal is transmitted on an uplink physical layer control channel (that is, an uplink channel capable of carrying a physical layer signaling only).

In one subembodiment of the above embodiment, the uplink physical layer control channel is a Physical Uplink Control CHannel (PUCCH).

In one subembodiment of the above embodiment, the uplink physical layer control channel is a short PUCCH (sPUCCH).

In one subembodiment of the above embodiment, the uplink physical layer control channel is a New Radio PUCCH (NR-PUCCH).

In one subembodiment of the above embodiment, the uplink physical layer control channel is a Narrow Band PUCCH (NB-PUCCH).

In one embodiment, the first information is semi-statically configured.

In one embodiment, the first information is carried by a higher-layer signaling.

In one embodiment, the first information is carried by an RRC signaling.

In one embodiment, the first information is all or part of an Information Element (IE) of an RRC signaling.

In one embodiment, the first information is carried by a Medium Access Control (MAC) Control Element (CE).

In one embodiment, the first information is carried by a Broadcast signaling.

In one embodiment, the first information is system information.

In one embodiment, the first information is transmitted in a System Information Block (SIB).

In one embodiment, the first information is dynamically configured.

In one embodiment, the first information is carried by a physical-layer signaling.

In one embodiment, the first information is a Downlink Control Information (DCI).

In one embodiment, the first information belongs to DCI with an UpLink Grant.

In one embodiment, the first information is a Field in DCI, the Field comprising a positive integer number of bit(s).

In one embodiment, the first information constitutes of multiple Fields of DCI, the Field comprising a positive integer number of bit(s).

In one embodiment, the first information is carried by a downlink physical-layer control channel (i.e., a downlink channel that can only be used for bearing a physical layer signaling).

In one embodiment, the first information is carried by a Physical Downlink Control Channel (PDCCH).

In one embodiment, the first information is carried by a short PDCCH (sPDCCH).

In one embodiment, the first information is carried by a New Radio PDCCH (NR-PDCCH).

In one embodiment, the first information is carried by a Narrow Band PDCCH (NB-PDCCH).

In one embodiment, the first information is transmitted on the first sub-band.

In one embodiment, the first information is transmitted on a frequency-band other than the first sub-band.

In one embodiment, the first information is transmitted on a frequency-band deployed on licensed spectrum other than the first sub-band.

In one embodiment, the first information is transmitted on a frequency-band deployed on unlicensed spectrum other than the first sub-band.

In one embodiment, the first information is transmitted on a frequency-band deployed on licensed spectrum.

In one embodiment, the first information is transmitted on a downlink physical layer control channel (i.e., a downlink channel that can only be used for bearing a physical layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, the first information is transmitted on a downlink physical data channel (i.e., a downlink channel that can be used for bearing physical layer data).

In one subembodiment of the above embodiment, the downlink physical-layer data channel is a PDSCH.

In one subembodiment of the above embodiment, the downlink physical-layer data channel is an sPDSCH.

In one subembodiment of the above embodiment, the downlink physical-layer data channel is an NR-PDSCH.

In one subembodiment of the above embodiment, the downlink physical-layer data channel is an NB-PDSCH.

In one embodiment, the first receiving parameter group comprises Spatial Rx parameters of the first radio signal.

In one embodiment, the first receiving parameter group comprises a receiving beam of the first radio signal.

In one embodiment, the first receiving parameter group comprises a receiving beamforming matrix of the first radio signal.

In one embodiment, the first receiving parameter group comprises a receiving analog beamforming matrix of the first radio signal.

In one embodiment, the first receiving parameter group comprises a receiving beamforming vector of the first radio signal.

In one embodiment, the first receiving parameter group comprises a spatial filtering of the first radio signal.

In one embodiment, the first access detection is used for determining whether the first sub-band is idle.

In one embodiment, the first access detection is used for determining whether the first sub-band is idle at the first time on the first sub-band.

In one embodiment, an end time of the first access detection is not later than the first time.

In one embodiment, the first time is after an end time of the first access detection.

In one embodiment, the second receiving parameter group comprises Spatial Rx parameters.

In one embodiment, the second receiving parameter group comprises a receiving beam.

In one embodiment, the second receiving parameter group comprises a receiving beamforming matrix.

In one embodiment, the second receiving parameter group comprises a receiving analog beamforming matrix.

In one embodiment, the second receiving parameter group comprises a receiving beamforming vector.

In one embodiment, the second receiving parameter group comprises a spatial filtering.

In one embodiment, the phrase that a second receiving parameter group is used for generating the second antenna port group refers to: a target transmitting parameter group of a radio signal transmitted on the second antenna port group can be inferred from the second receiving parameter group.

In one subembodiment of the above embodiment, the second receiving parameter group comprises a spatial receiving parameter, and the target transmitting parameter group comprises Spatial Tx parameters.

In one subembodiment of the above embodiment, the second receiving parameter group comprises a receiving beam, and the target transmitting parameter group comprises a transmitting beam.

In one subembodiment of the above embodiment, the second receiving parameter group comprises a receiving beamforming matrix, and the target transmitting parameter group comprises a transmitting beamforming matrix.

In one subembodiment of the above embodiment, the second receiving parameter group comprises a receiving analog beamforming matrix, and the target transmitting parameter group comprises a transmitting analog beamforming matrix.

In one subembodiment of the above embodiment, the second receiving parameter group comprises a receiving beamforming vector, and the target transmitting parameter group comprises a transmitting beamforming vector.

In one subembodiment of the above embodiment, the second receiving parameter group comprises a receiving spatial filtering, and the target transmitting parameter group comprises a transmitting spatial filtering.

In one embodiment, the phrase that a second receiving parameter group is used for generating the second antenna port group refers to: target transmitting parameter groups of radio signals transmitted on the second receiving parameter group and the second antenna port group are the same.

In one subembodiment of the above embodiment, the second receiving parameter group comprises a spatial receiving parameter, and the target transmitting parameter group comprises Spatial Tx parameters.

In one subembodiment of the above embodiment, the second receiving parameter group comprises a receiving beam, and the target transmitting parameter group comprises a transmitting beam.

In one subembodiment of the above embodiment, the second receiving parameter group comprises a receiving beamforming matrix, and the target transmitting parameter group comprises a transmitting beamforming matrix.

In one subembodiment of the above embodiment, the second receiving parameter group comprises a receiving analog beamforming matrix, and the target transmitting parameter group comprises a transmitting analog beamforming matrix.

In one subembodiment of the above embodiment, the second receiving parameter group comprises a receiving beamforming vector, and the target transmitting parameter group comprises a transmitting beamforming vector.

In one subembodiment of the above embodiment, the second receiving parameter group comprises a receiving spatial filtering, and the target transmitting parameter group comprises a transmitting spatial filtering.

In one embodiment, the phrase that a second receiving parameter group is used for generating the second antenna port group refers to: the second receiving parameter group comprises a target transmitting parameter group of a radio signal transmitted on the second antenna port group.

In one subembodiment of the above embodiment, the second receiving parameter group comprises Spatial Rx parameters, and the target transmitting parameter group comprises Spatial Tx parameters.

In one subembodiment of the above embodiment, the second receiving parameter group comprises a receiving beam, and the target transmitting parameter group comprises a transmitting beam.

In one subembodiment of the above embodiment, the second receiving parameter group comprises a receiving beamforming matrix, and the target transmitting parameter group comprises a transmitting beamforming matrix.

In one subembodiment of the above embodiment, the second receiving parameter group comprises a receiving analog beamforming matrix, and the target transmitting parameter group comprises a transmitting analog beamforming matrix.

In one subembodiment of the above embodiment, the second receiving parameter group comprises a receiving beamforming vector, and the target transmitting parameter group comprises a transmitting beamforming vector.

In one subembodiment of the above embodiment, the second receiving parameter group comprises a receiving spatial filtering, and the target transmitting parameter group comprises a transmitting spatial filtering.

In one embodiment, the phrase that a second receiving parameter group is used for generating the second antenna port group refers to: the second receiving parameter group comprises a receiving beamforming matrix, and a beam width corresponding to the receiving beamforming matrix is not less than a beam width corresponding to a transmitting beamforming matrix of the second antenna port group.

In one embodiment, the phrase that a second receiving parameter group is used for generating the second antenna port group refers to: the second receiving parameter group comprises a receiving beamforming matrix, and a beam direction corresponding to the receiving beamforming matrix comprises a beam direction corresponding to a transmitting beamforming matrix of the second antenna port group.

In one embodiment, the phrase that a second receiving parameter group is used for generating the second antenna port group refers to: the second receiving parameter group comprises a receiving beam, and a beam width corresponding to the receiving beam is greater than that corresponding to a transmitting beam of the second antenna port group.

In one embodiment, the phrase that a second receiving parameter group is used for generating the second antenna port group refers to: the second receiving parameter group comprises a receiving beam, which comprises a transmitting beam of the second antenna port group.

In one embodiment, the phrase that the second receiving parameter group is used for the first access detection refers to: a receiving parameter group of the first access detection comprises the second receiving parameter group.

In one embodiment, the phrase that the second receiving parameter group is used for the first access detection refers to: the receiving parameter group of the first access detection is the same as the second receiving parameter group.

In one embodiment, the phrase that the second receiving parameter group is used for the first access detection refers to: a receiving parameter group of the first access detection comprises the second receiving parameter group, and a receiving parameter group of the first access detection comprises a receiving parameter not belonging to the second receiving parameter group.

In one embodiment, the phrase that the second receiving parameter group is used for the first access detection refers to: the second receiving parameter group can be used for inferring that a receiving parameter group of the first access detection.

In one embodiment, the phrase that the second receiving parameter group is used for the first access detection refers to: the second receiving parameter group comprises a receiving beamforming matrix, and a beam width corresponding to the receiving beamforming matrix is not greater than a beam width corresponding to a receiving beamforming matrix of the first access detection.

In one embodiment, the phrase that the second receiving parameter group is used for the first access detection refers to: the second receiving parameter group comprises a receiving beamforming matrix, and a beam direction corresponding to the receiving beamforming matrix is comprised in a beam direction corresponding to a transmitting beamforming matrix of the first access detection.

In one embodiment, the phrase that the second receiving parameter group is used for the first access detection refers to: the second receiving parameter group comprises a receiving beam, and a beam width corresponding to the receiving beam is not greater than a beam width corresponding to a transmitting beam of the first access detection.

In one embodiment, the phrase that the second receiving parameter group is used for the first access detection refers to: the second receiving parameter group comprises a receiving beam, and the receiving beam is comprised in a transmitting beam of the first access detection.

In one embodiment, a receiving parameter group of the first access detection comprises Spatial Rx parameters.

In one embodiment, a receiving parameter group of the first access detection comprises a receiving beam.

In one embodiment, a receiving parameter group of the first access detection comprises a receiving beamforming matrix.

In one embodiment, a receiving parameter group of the first access detection comprises a receiving analog beamforming matrix.

In one embodiment, a receiving parameter group of the first access detection comprises a receiving beamforming vector.

In one embodiment, a receiving parameter group of the first access detection comprises a spatial filtering.

In one embodiment, the phrase that a transmission of a second radio signal is dropped at the first time on the first sub-band refers to: a transmission of the second radio signal is delayed to a second time, the second time being after the first time.

In one embodiment, the phrase that a transmission of a second radio signal is dropped at the first time on the first sub-band refers to: a transmission of the second radio signal is dropped, and a new scheduling signaling is waited for transmitting a target bit block, the second radio signal carrying the bit block.

In one embodiment, the phrase that a transmission of a second radio signal is dropped at the first time on the first sub-band refers to: a transmission of the second radio signal is dropped.

Embodiment 2

Figure 2:
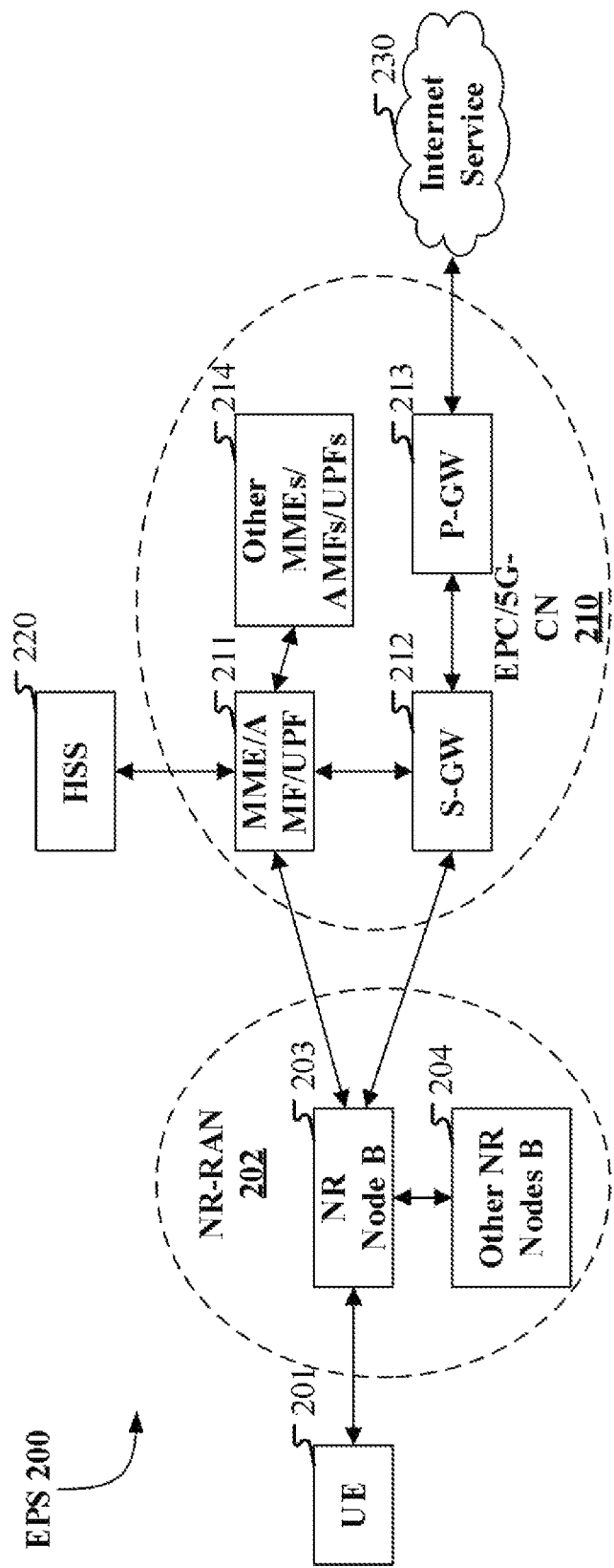
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The NR 5G or LTE network architecture 200 may be called an Evolved Packet System (EPS) 200 or some other applicable terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrowband physical network devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSSs).

In one embodiment, the UE 201 corresponds to the UE in the present disclosure.

In one embodiment, the gNB 203 corresponds to the base station in the present disclosure.

In one subembodiment, the UE 201 supports wireless communications for data transmissions on unlicensed spectrum.

In one subembodiment, the gNB 203 supports wireless communications for data transmissions on unlicensed spectrum.

In one subembodiment, the UE 201 supports massive MIMO wireless communications.

In one subembodiment, the gNB 203 supports massive MIMO wireless communications.

Embodiment 3

Figure 3:
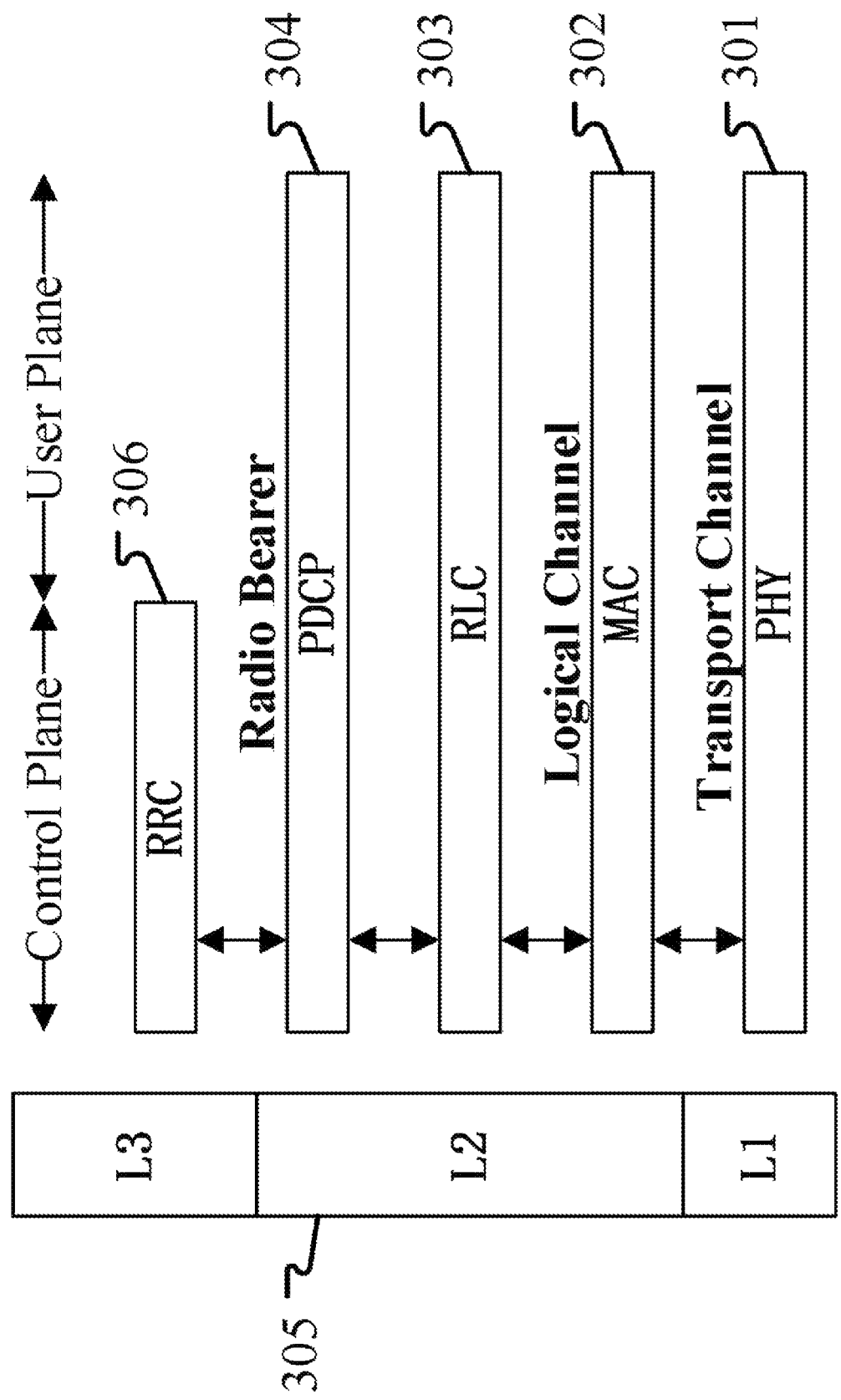
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 layer 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer data packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first radio signal in the present disclosure is generated by the PHY 301.

In one embodiment, the second radio signal in the present disclosure is generated by the PHY 301.

In one embodiment, the determination of the second receiving parameter group out of K1 receiving parameter groups in the present disclosure is generated by the PHY 301.

In one embodiment, the first access detection in the present disclosure is generated by the PHY 301.

In one embodiment, the K radio signals in the present disclosure are generated by the PHY 301.

In one embodiment, the first information in the present disclosure is generated by the PHY 301.

In one embodiment, the first information in the present disclosure is generated by the RRC sublayer 306.

In one embodiment, the first information in the present disclosure is generated by the MAC sublayer 302.

Embodiment 4

Figure 4:
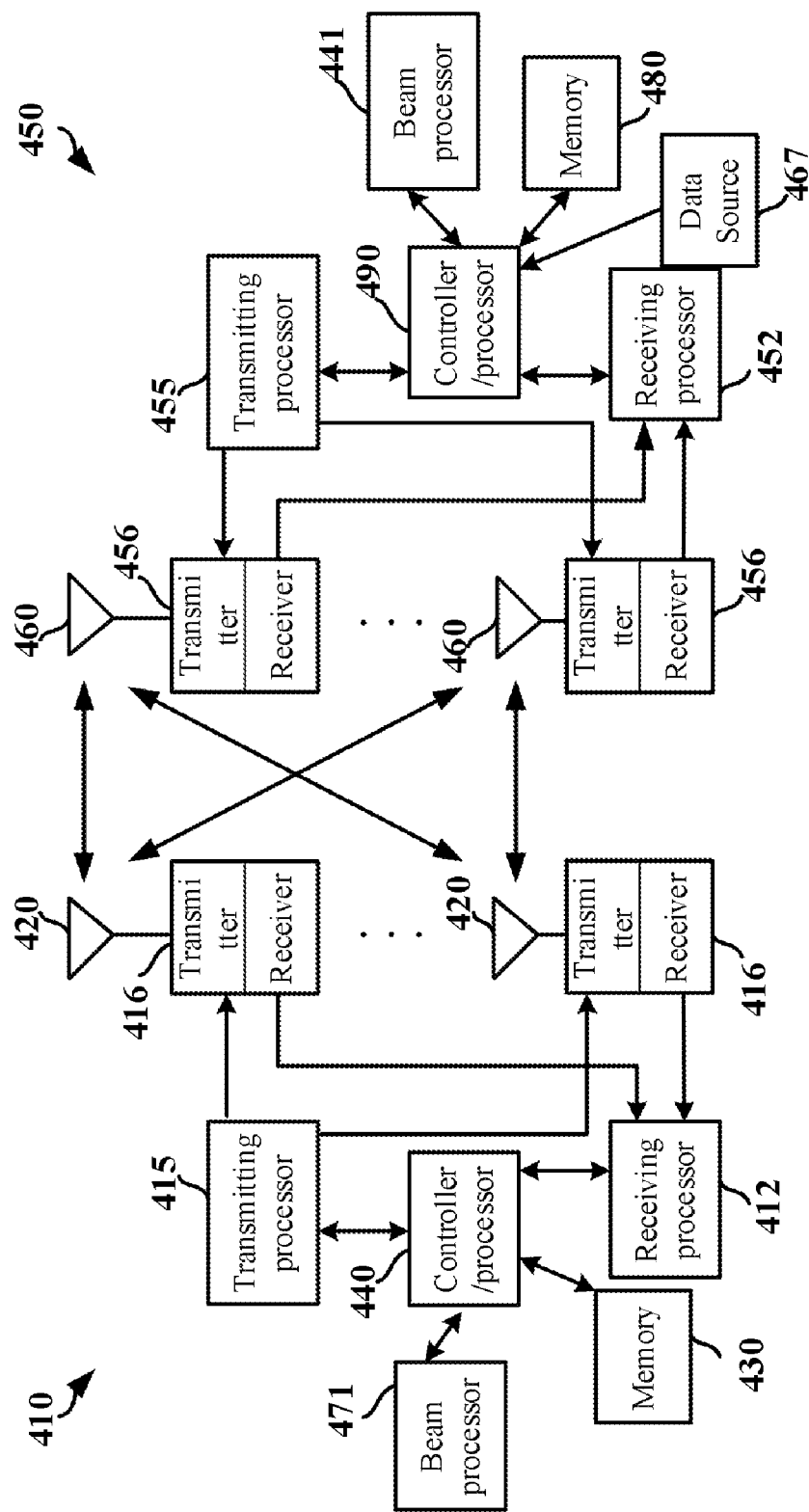
FIG. 4 illustrates a schematic diagram of a New Radio (NR) node and a UE according to one embodiment of the present disclosure.

Embodiment 4 illustrates a schematic diagram of a NR node and a UE according to the present disclosure, as shown in FIG. 4. FIG. 4 is a block diagram of a gNB 410 in communication with a UE 450 in an access network.

The base station (410) comprises a controller/processor 440, a memory 430, a receiving processor 412, a transmitting processor 415, a transmitter/receiver 416 and an antenna 420.

The UE (450) comprises a controller/processor 490, a memory 480, a data source 467, a transmitting processor 455, a receiving processor 452, a transmitter/receiver 456 and an antenna 460.

In downlink (DL) transmission, processes relevant to the base station (410) include the following:

a higher layer packet is provided to the controller/processor 440, the controller/processor 440 provides header compression, encryption, packet segmentation and reordering, and a multiplexing between a logical channel and a transport channel so as to implement the L2 layer protocols used for the user plane and the control plane; a higher layer packet may include data or control information, such as a Downlink Shared Channel (DL-SCH);

the controller/processor 440 is connected to the memory 430 that stores program codes and data. The memory 430 may be a computer readable medium;

the controller/processor 440 includes a scheduling unit for transmission requirement, and the scheduling unit is configured to schedule air interface resources corresponding to transmission requirement;

the beam processor 471 determines a first radio signal and first information;

the transmitting processor 415 receives a bit stream output from the controller/processor 440, and performs various signal transmitting processing functions of an L1 layer (that is, PHY), including encoding, interleaving, scrambling, modulation, power control/allocation, and generation of physical layer control signaling (including PBCH, PDCCH, PHICH, PCFICH, reference signal), etc.;

the transmitter 416 is configured to convert the baseband signal provided by the transmitting processor 415 into a radio-frequency signal and transmit the radio-frequency signal via the antenna 420; each transmitter 416 performs sampling processing on respective input symbol streams to obtain respective sampled signal streams; each transmitter 416 performs further processing (for example, digital-to-analogue conversion, amplification, filtering, upconversion, etc.) on respective sampled streams to obtain a downlink signal.

In DL transmission, processes relevant to the UE (450) include the following:

the receiver 456 is configured to convert a radio-frequency signal received via the antenna 460 into a baseband signal and provide the baseband signal to the receiving processor 452;

the receiving processor 452 performs signal receiving processing functions of an L1 layer (that is, PHY), including decoding, de-interleaving, descrambling, demodulation, extraction of physical layer control signaling, etc.;

the beam processor 441 determines a first radio signal and first information;

the controller/processor 490 receives a bit stream output from the receiving processor 452, and provides header decompression, decryption, packet segmentation and reordering as well as multiplexing and de-multiplexing between a logical channel and a transport channel to implement the L2 protocol used for the user plane and the control plane;

the controller/processor 490 is connected to the memory 480 that stores program code and data. The memory 480 may be called a computer readable medium.

In uplink (UL) transmission, processes relevant to the base station (410) include the following:

the receiver 416 receives a radio frequency signal via a corresponding antenna 420, converts the received radio frequency signal into a baseband signal, and provides the baseband signal to the receiving processor 412;

the receiving processor 412 performs various signal receiving processing functions for L1 (i.e., PHY), including decoding, de-interleaving, descrambling, demodulation and extraction of physical layer control signaling;

the controller/processor 440 implements function of L2 layer, and is connected to the memory 430 that stores program codes and data;

the controller/processor 440 provides de-multiplexing between a transport channel and a logical channel, packet reassembling, decryption, header decompression, and control signal processing to recover a higher-layer packet from the UE 450; a higher-layer packet from the controller/processor 440 can be provided to the core network;

the beam processor 471 determines whether an uplink transmission is performed at a first time on a first sub-band;

in UL (Uplink), processes relevant to the UE (450) include the following:

the data source 467 provides a higher-layer packet to the controller/processor 490. The data source 467 represents all protocol layers above the L2 layer;

the transmitter 456 transmits a radio frequency signal via a corresponding antenna 460, converts the baseband signal into a radio frequency signal, and provides the radio frequency signal to a corresponding antenna 460;

the transmitting processor 455 implements various signal receiving processing functions used for L1 (i.e., PHY), including decoding, de-interleaving, descrambling, demodulation and extraction of physical layer control signaling;

the controller/processor 490 based on radio resource allocation of the gNB 410 performs header compression, encryption, packet segmentation and reordering and multiplexing between a logical channel and a transport channel, so as to implement the L2 function used for user plane and control plane;

the controller/processor 490 is also in charge of HARQ operation, retransmission of a lost packet, and a signaling to the gNB 410;

the beam processor 441 determines whether an uplink transmission is performed at a first time on a first sub-band;

In one subembodiment, the UE 450 device includes at least one processor and at least one memory, and the at least one memory includes computer program codes. The at least one memory and the computer program codes are configured to be used in collaboration with the at least one processor. The UE 450 at least: receives a first radio signal, the first radio signal being transmitted by a first antenna port group; receives first information; and performs a first access detection to determine whether an uplink transmission is performed at a first time on a first sub-band; if so, transmits a second radio signal by a second antenna port group at the first time on the first sub-band; if not, drops transmission of a second radio signal at the first time on the first sub-band; herein, the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one embodiment, the UE 450 comprises a memory that stores a computer readable instruction program. The computer readable instruction program generates an action when executed by at least one processor. The action includes: receiving a first radio signal, the first radio signal being transmitted by a first antenna port group; receiving first information; and performing a first access detection to determine whether an uplink transmission is performed at a first time on a first sub-band; if so, transmitting a second radio signal by a second antenna port group at the first time on the first sub-band; if not, dropping transmission of a second radio signal at the first time on the first sub-band; wherein the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one subembodiment, the gNB 410 comprises: at least one processor and at least one memory, and the at least one memory comprises computer program codes. The at least one memory and the computer program codes are configured to be used in collaboration with the at least one processor. The gNB 410 at least: transmits a first radio signal, the first radio signal being transmitted by a first antenna port group; transmits first information; and monitors a second radio signal at a first time on a first sub-band; wherein a first access detection is used for determining whether an uplink transmission is performed at the first time on the first sub-band; if so, transmits the second radio signal by a second antenna port group at the first time on the first sub-band; if not, drops transmission of the second radio signal at the first time on the first sub-band; the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one subembodiment, the gNB 410 includes a memory that stores a computer readable instruction program. The computer readable instruction program generates an action when executed by at least one processor. The action includes: transmitting a first radio signal, the first radio signal being transmitted by a first antenna port group; transmitting first information; and monitoring a second radio signal at a first time on a first sub-band; wherein a first access detection is used for determining whether an uplink transmission is performed at the first time on the first sub-band; if so, transmitting the second radio signal by a second antenna port group at the first time on the first sub-band; if not, dropping transmission of the second radio signal at the first time on the first sub-band; the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one subembodiment, the UE 450 corresponds to the UE in the present disclosure.

In one subembodiment, the gNB 410 corresponds to the base station in the present disclosure.

In one subembodiment, at least the first two of the receiver 456, the receiving processor 452 and the controller/processor 490 are used for receiving the first radio signal in the present disclosure.

In one subembodiment, at least the first two of the transmitter 416, the transmitting processor 415 and the controller/processor 440 are used for transmitting the first radio signal in the present disclosure.

In one subembodiment, at least the first two of the receiver 456, the receiving processor 452 and the controller/processor 490 are used for receiving the first information in the present disclosure.

In one subembodiment, at least the first two of the transmitter 416, the transmitting processor 415 and the controller/processor 440 are used for transmitting the first information in the present disclosure.

In one subembodiment, at least the first two of the receiver 456, the receiving processor 452 and the controller/processor 490 are used for performing the first access detection in the present disclosure.

In one subembodiment, at least the first two of the receiver 456, the receiving processor 452 and the controller/processor 490 are used for determining the second receiving parameter group in the present disclosure out of the K1 receiving parameter groups in the present disclosure.

In one subembodiment, at least the first two of the receiver 456, the receiving processor 452 and the controller/processor 490 are used for receiving the K radio signals in the present disclosure.

In one subembodiment, at least the first two of the transmitter 416, the transmitting processor 415 and the controller/processor 440 are used for transmitting the K radio signals in the present disclosure.

In one subembodiment, at least the first two of the transmitter 456, the transmitting processor 455 and the controller/processor 490 are used for transmitting the second radio signal in the present disclosure.

In one subembodiment, at least the first two of the receiver 416, the receiving processor 412 and the controller/processor 440 are used for receiving the second radio signal in the present disclosure.

Embodiment 5

Figure 5:
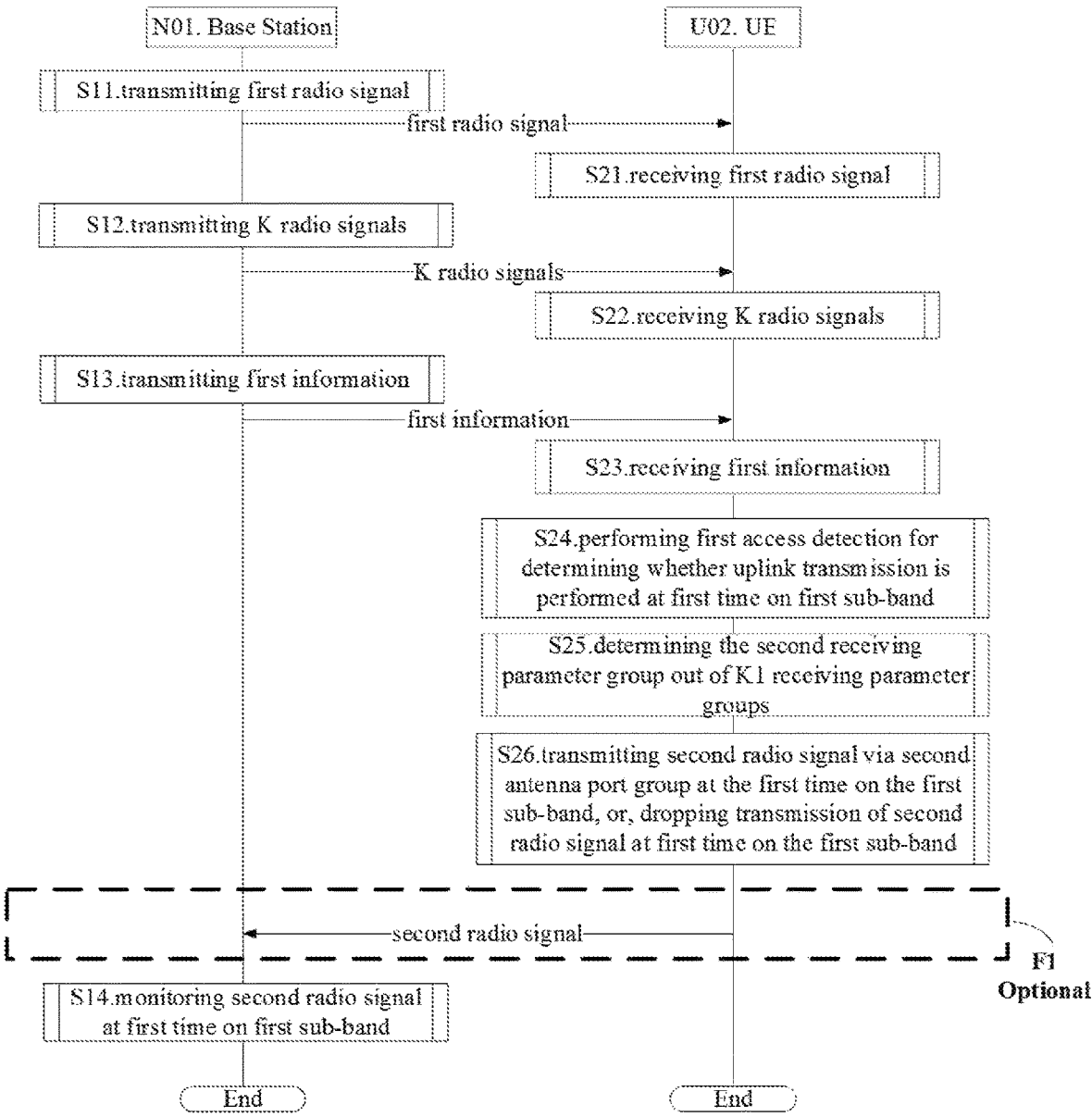
FIG. 5 illustrates a flowchart of wireless transmission according to one embodiment of the present disclosure.

Embodiment 5 illustrates a flowchart of wireless transmissions, as shown in FIG. 5. In FIG. 5, a base station N01 is a maintenance base station for a serving cell of a UE U02. In FIG. 5, the block F1 is optional.

For N01, transmits a first radio signal in step S11; transmits K radio signals in step S12; transmits first information in step S13; and monitors a second radio signal at a first time on a first sub-band in step S14.

For U02, receives a first radio signal in step S21; receives K radio signals in step S22; receives first information in step S23; performs a first access detection to determine whether an uplink transmission is performed at a first time on a first sub-band in step S24; determines the second receiving parameter group out of K1 receiving parameter groups in step S25; transmits a second radio signal by a second antenna port group at a first time on the first sub-band in step S26, or, drops a transmission of a second radio signal at a first time on the first sub-band.

In Embodiment 5, the first radio signal is transmitted by a first antenna port group; the first antenna port group comprises a positive integer number of antenna port(s), and the second antenna port group comprises a positive integer number of antenna port(s); a first receiving parameter group is used by the UE U02 for receiving the first radio signal, and a second receiving parameter group is used by the UE U02 for generating the second antenna port group; the first receiving parameter group and the second receiving parameter group both belong to a first receiving parameter space, and the first information and the first receiving parameter group are used together by the UE U02 for determining the first receiving parameter space. The K1 is a positive integer greater than 1; each of the K1 receiving parameter groups belongs to the first receiving parameter space. The K is a positive integer greater than 1; the K radio signals are respectively transmitted by K antenna port groups, and K receiving parameter groups are respectively used by the UE U02 for receiving the K radio signals; any receiving parameter group among the K1 receiving parameter groups different from the first receiving parameter group is one of the K receiving parameter groups.

In one embodiment, a second radio signal is transmitted by a second antenna port group at a first time on the first sub-band in step S26, and the block F1 is retained.

In one embodiment, a transmission of a second radio signal at a first time on the first sub-band in dropped in step S26, and the block F1 does not exist.

In one embodiment, the K1 receiving parameter groups are different from each other.

In one embodiment, the K1 is 2.

In one embodiment, the first receiving parameter group is one of the K1 receiving parameter groups.

In one embodiment, the second receiving parameter group is one of the K1 receiving parameter groups.

In one embodiment, the first receiving parameter space consists of the K1 receiving parameter groups.

In one embodiment, each of the K1 receiving parameter groups comprises Spatial Rx parameters.

In one embodiment, each of the K1 receiving parameter groups comprises a receiving beam.

In one embodiment, each of the K1 receiving parameter groups comprises a receiving beamforming matrix.

In one embodiment, each of the K1 receiving parameter groups comprises a receiving analog beamforming matrix.

In one embodiment, each of the K1 receiving parameter groups comprises a receiving beamforming vector.

In one embodiment, each of the K1 receiving parameter groups comprises a spatial filtering.

In one embodiment, K1−1 receiving parameter group(s) other than the first receiving parameter group among the K1 receiving parameter groups is(are) respectively one of the K receiving parameter groups.

In one embodiment, the K receiving parameter groups comprise Spatial Rx parameters of the K radio signals respectively.

In one embodiment, the K receiving parameter groups comprise receiving beams of the K radio signals respectively.

In one embodiment, the K receiving parameter groups comprise receiving beamforming matrices of the K radio signals respectively.

In one embodiment, the K receiving parameter groups comprise receiving analog beamforming matrices of the K radio signals respectively.

In one embodiment, the K receiving parameter groups comprise receiving beamforming vectors of the K radio signals respectively.

In one embodiment, the K receiving parameter groups comprise receiving spatial filterings of the K radio signals respectively.

Embodiment 6

Figure 6:
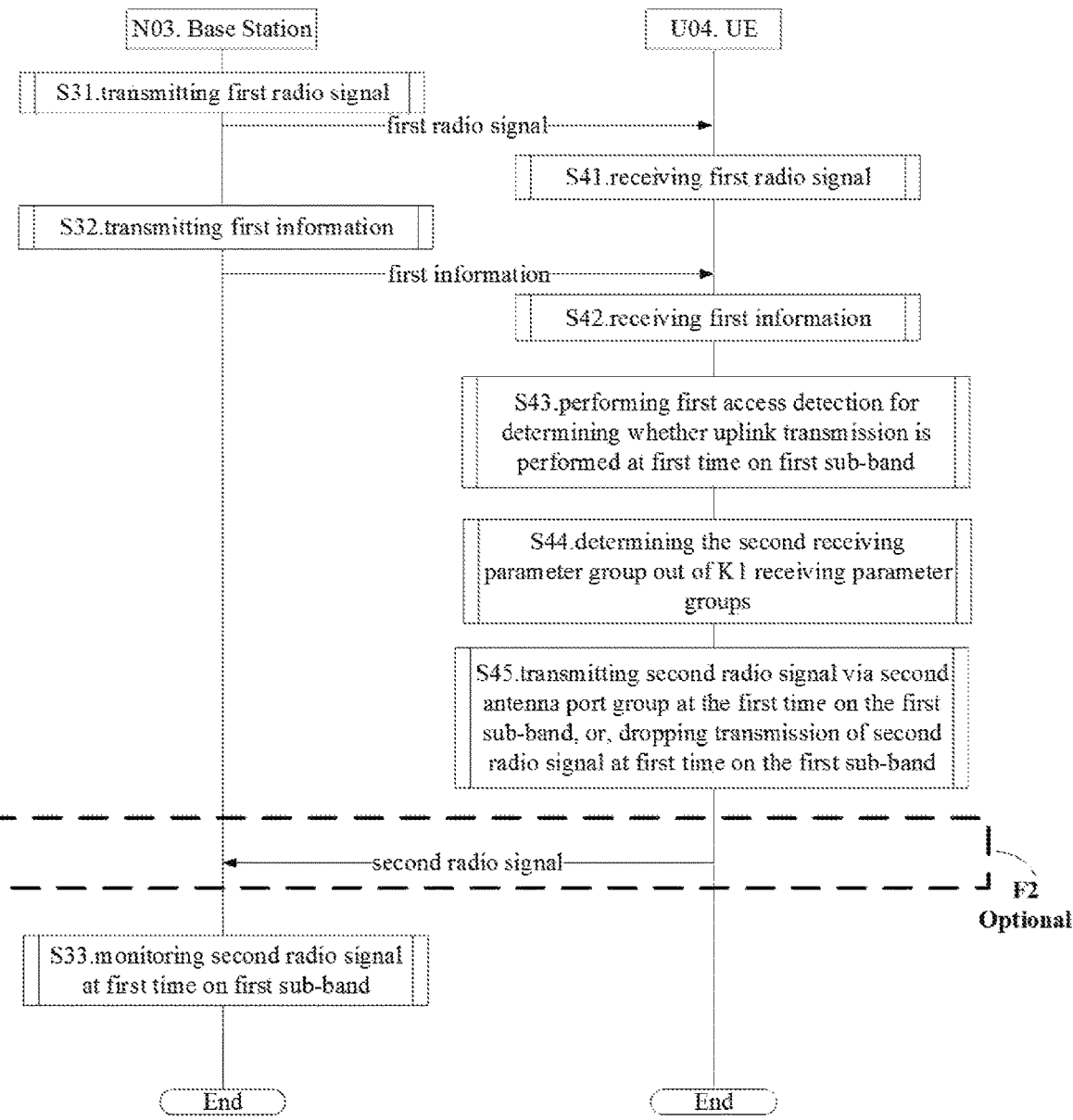
FIG. 6 illustrates a flowchart of wireless transmission according to another embodiment of the present disclosure.

Embodiment 6 illustrates another flowchart of wireless transmission, as shown in FIG. 5. In FIG. 5, a base station N03 is a maintenance base station for a serving cell of a UE U04. In FIG. 6, the block F2 is optional.

For N03, transmits a first radio signal in step S31; transmits first information in step S32; and monitors a second radio signal at a first time on a first sub-band in step S33.

For U04, receives a first radio signal in step S41; receives first information in step S42; performs a first access detection for determining whether an uplink transmission is performed at a first time on a first sub-band in step S43; determines the second receiving parameter group out of K1 receiving parameter groups in step S44; transmits a second radio signal by a second antenna port group at a first time on the first sub-band, or drops transmission of a second radio signal at a first time on the first sub-band.

In Embodiment 6, the first radio signal is transmitted by a first antenna port group; the first antenna port group comprises a positive integer number of antenna port(s), and the second antenna port group comprises a positive integer number of antenna port(s); a first receiving parameter group is used by the UE U02 for receiving the first radio signal, and a second receiving parameter group is used by the UE U02 for generating the second antenna port group; the first receiving parameter group and the second receiving parameter group both belong to a first receiving parameter space, and the first information and the first receiving parameter group are used together by the UE U02 for determining the first receiving parameter space. The K1 is a positive integer greater than 1; the K1 receiving parameter groups all belong to the first receiving parameter space. In the first receiving parameter space, the UE determines the K1 receiving parameter groups by itself.

In one embodiment, how the UE determines the K1 receiving parameter groups is a UE implementation issue.

In one embodiment, a second radio signal is transmitted by a second antenna port group at a first time on the first sub-band in step S45, and the block F2 is retained.

In one embodiment, a transmission of a second radio signal at a first time on the first sub-band in dropped in step S45, and the block F2 does not exist.

Embodiment 7

Figure 7:
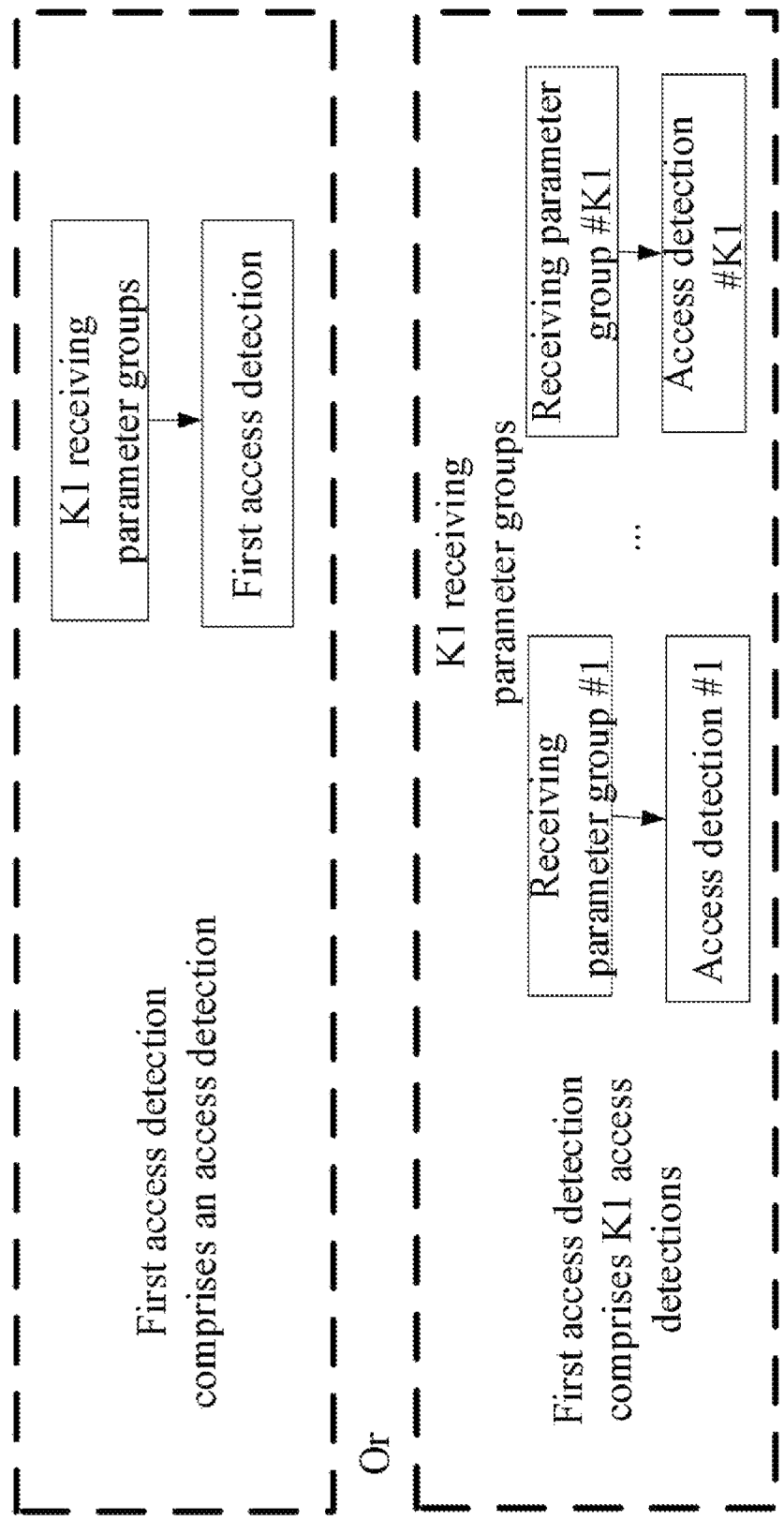
FIG. 7 illustrates a schematic diagram of a relationship between a first access detection and K1 receiving parameter groups according to one embodiment of the present disclosure.

Embodiment 7 illustrates a schematic diagram of a relationship between a first access detection and K1 receiving parameter groups; as shown in FIG. 7.

In Embodiment 7, the first access detection is performed to determine whether an uplink transmission is performed at a first time on a first sub-band in the present disclosure; if so, the second radio signal in the present disclosure is transmitted by a second antenna port group in the present disclosure at the first time on the first sub-band; if not, a transmission of the second radio signal is dropped at the first time on the first sub-band; the second receiving parameter group in the present disclosure is used for generating the second antenna port group: the second receiving parameter group is determined out of the K1 receiving parameter groups, K1 being a positive integer greater than 1.

In one embodiment, the first access detection comprises an access detection.

In one embodiment, each of the K1 receiving parameter groups is used for the first access detection.

In one subembodiment of the above embodiment, a receiving parameter group of the first access detection comprises the K1 receiving parameter groups.

In one subembodiment of the above embodiment, a receiving parameter group of the first access detection is the same as a set of the K1 receiving parameter groups.

In one subembodiment of the above embodiment, a receiving parameter group of the first access detection comprises the K1 receiving parameter groups, and a receiving parameter group of the first access detection comprises a receiving parameter not belonging to the K1 receiving parameter groups.

In one embodiment of the above embodiment, the K1 receiving parameter groups can be used for inferring a receiving parameter group of the first access detection.

In one embodiment, each of the K1 receiving parameter groups comprises a receiving beamforming matrix, and each beam width corresponding to the receiving beamforming matrix is not greater than a beam width corresponding to a receiving beamforming matrix of the first access detection.

In one subembodiment of the above embodiment, each of the K1 receiving parameter groups comprises a receiving beamforming matrix, and each beam direction corresponding to the receiving beamforming matrix is comprised by a beam direction corresponding to a transmitting beamforming matrix of the first access detection.

In one subembodiment of the above embodiment, each of the K1 receiving parameter groups comprises a receiving beam, each beam width corresponding to the receiving beam is not greater than a beam width corresponding to a transmitting beam of the first access detection.

In one subembodiment of the above embodiment, each of the K1 receiving parameter groups comprises a receiving beam, the receiving beam being comprised by a transmitting beam of the first access detection.

In one embodiment, the first access detection comprises K1 access detections, the K1 receiving parameter groups are used for the K1 access detection respectively.

In one embodiment, an end time of any of the K1 access detections is not later than the first time.

In one embodiment, the first time is after an end time of any of the K1 access detections.

In one embodiment, a given receiving parameter group is one of the K1 receiving parameter groups, a given access detection is an access detection corresponding to the given receiving parameter group among the K1 access detection, and the given receiving parameter group is used for the given access detection.

In one subembodiment of the above embodiment, the phrase that the given receiving parameter group is used for the given access detection refers to: a receiving parameter group of the given access detection comprises the given receiving parameter group.

In one subembodiment of the above embodiment, the phrase that the given receiving parameter group is used for the given access detection refers to: a receiving parameter group of the given access detection is the same as the given receiving parameter group.

In one subembodiment of the above embodiment, the phrase that the given receiving parameter group is used for the given access detection refers to: a receiving parameter group of the given access detection comprises the given receiving parameter group, and a receiving parameter group of the given access detection comprises a receiving parameter not belonging to the given receiving parameter group.

In one subembodiment of the above embodiment, the phrase that the given receiving parameter group is used for the given access detection refers to: the given receiving parameter group can be used for inferring a receiving parameter group of the given access detection.

In one subembodiment of the above embodiment, the phrase that the given receiving parameter group is used for the given access detection refers to: the given receiving parameter group comprises a receiving beamforming matrix, and a beam width corresponding to the receiving beamforming matrix is not greater than a beam width corresponding to a receiving beamforming matrix of the given access detection.

In one subembodiment of the above embodiment, the phrase that the given receiving parameter group is used for the given access detection refers to: the given receiving parameter group comprises a receiving beamforming matrix, and a beam direction corresponding to the receiving beamforming matrix is comprised in a beam direction corresponding to a transmitting beamforming matrix of the given access detection.

In one subembodiment of the above embodiment, the phrase that the given receiving parameter group is used for the given access detection refers to: the given receiving parameter group comprises a receiving beam, and a beam width corresponding to the receiving beam is not greater than a beam width corresponding to a transmitting beam of the given access detection.

In one subembodiment of the above embodiment, the phrase that the given receiving parameter group is used for the given access detection refers to: the given receiving parameter group comprises a receiving beam, and the receiving beam is comprised in a transmitting beam of the given access detection.

In one subembodiment of the above embodiment, a receiving parameter group of the given access detection comprises Spatial Rx parameters.

In one subembodiment of the above embodiment, a receiving parameter group of the given access detection comprises a receiving beam.

In one subembodiment of the above embodiment, a receiving parameter group of the given access detection comprises a receiving beamforming matrix.

In one subembodiment of the above embodiment, a receiving parameter group of the given access detection comprises a receiving analog beamforming matrix.

In one subembodiment of the above embodiment, a receiving parameter group of the given access detection comprises a receiving beamforming vector.

In one subembodiment of the above embodiment, a receiving parameter group of the given access detection comprises a receiving spatial filtering.

Embodiment 8

Figure 8:
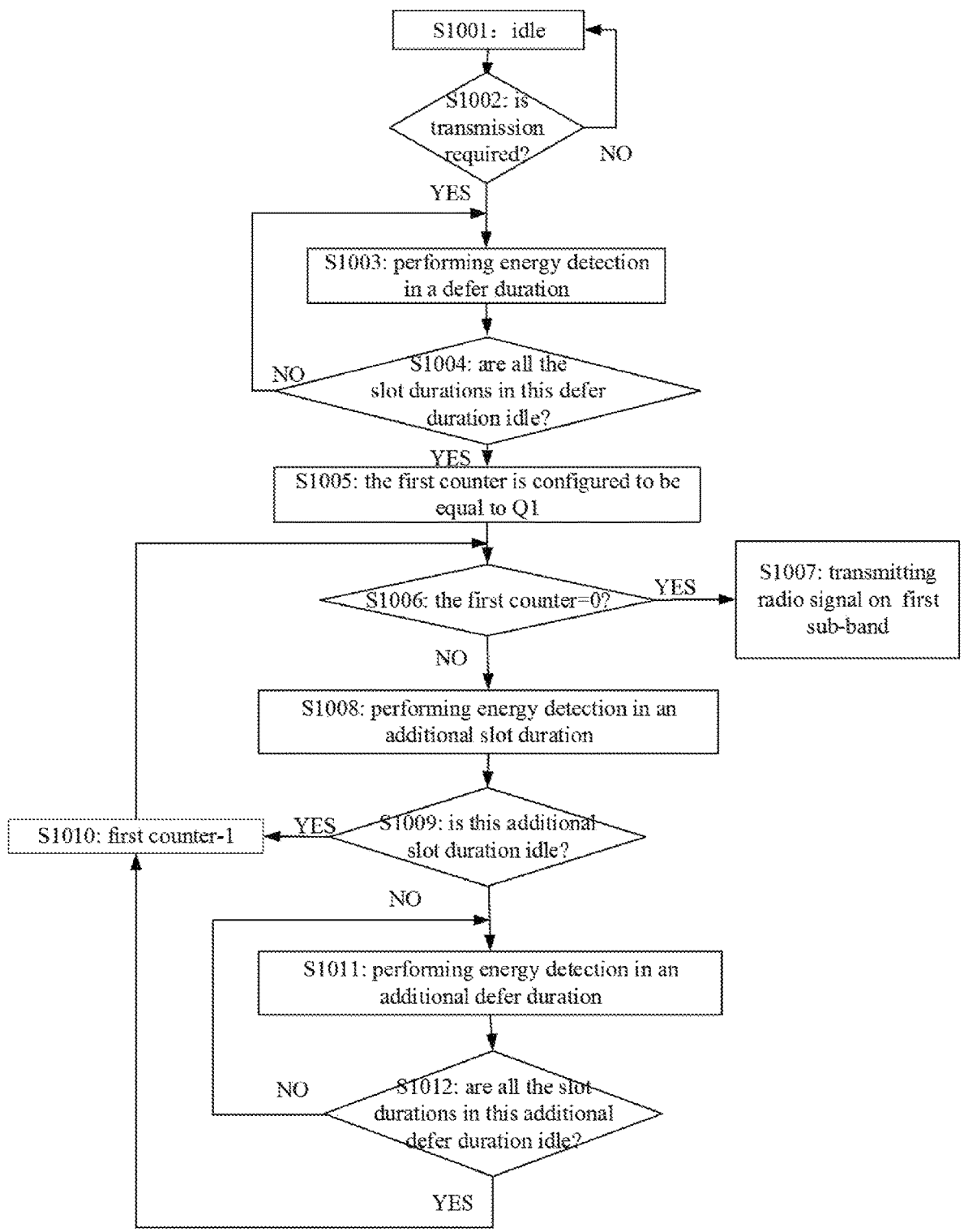
FIG. 8 illustrates a schematic diagram illustrating a given access detection being used for determining whether a given radio signal is transmitted at a given time on a given sub-band according to one embodiment of the present disclosure.

Embodiment 8 illustrates a schematic diagram illustrating a given access detection being used for determining whether a given radio signal is transmitted at a given time on a given sub-band according to one embodiment of the present disclosure; as shown in FIG. 8.

In Embodiment 8, the given access detection comprises performing the Q energy detection(s) respectively in Q time sub-pool(s) on the given sub-band to obtain Q detection value(s), Q being a positive integer. The given access detection corresponds to the first access detection or any of the first access detection, the given time corresponds to the first time in the present disclosure, and the given radio signal corresponds to the second radio signal in the present disclosure. The process of the given access detection can be described by the flowchart in FIG. 8.

In FIG. 8, the UE in the present disclosure is idle in step S1001, determines whether a transmission is required in step S1002; performs an energy detection within a defer duration in step S1003; determines whether all slot durations in the defer duration are idle in step S1004, if so, sets a first counter to be equal to Q1 in step S1005, the Q1 being an integer not greater than the Q; otherwise, returns back to step S1004; determines whether the first counter is 0 in step S1006, if so, transmits a radio signal on the first sub-band in the present disclosure; otherwise, performs an energy detection within an additional slot duration in step S1008; determines whether the additional slot duration is idle in step S1009, if so, reduces the first counter by 1 in step S1010, and then returns back to step 1006; otherwise, performs energy detection within an additional defer duration in step S1011; determines whether all slot durations in the additional defer duration are idle in step S1012, and if so, moves to step S1010; otherwise, returns back to step S1011.

In Embodiment 8, the first counter in FIG. 8 is reset before the given time, and the result of the given access detection is that the channel is idle, and the given radio signal can be transmitted at the given time; otherwise, the given radio signal cannot be transmitted at the given time. A condition for resetting the first counter is that Q1 detection value(s) among the Q detection value(s) corresponding to Q1 time sub-pool(s) among the Q time sub-pool(s) is(are) lower than a first reference threshold, and a start time of the Q1 time sub-pool(s) is after step S1005 in FIG. 8.

In one embodiment, the Q time sub-pool(s) comprise(s) all defer durations in FIG. 8.

In one embodiment, the Q time sub-pool(s) comprise(s) part of defer durations in FIG. 8.

In one embodiment, the Q time sub-pool(s) comprise(s) all defer durations and all additional slot durations in FIG. 8.

In one embodiment, the Q time sub-pool(s) comprise(s) part of defer durations and part of additional slot durations in FIG. 8.

In one embodiment, the Q time sub-pool(s) comprise(s) all defer durations, all additional slot durations and all additional defer durations in FIG. 8.

In one embodiment, the Q time sub-pool(s) comprise(s) all defer durations, part of additional slot durations and all additional defer durations in FIG. 8.

In one embodiment, the Q time sub-pool(s) comprise(s) all defer durations, part of additional slot durations and part of additional defer durations in FIG. 8.

In one embodiment, a duration of any of the Q time sub-pool(s) is one of 16 microseconds or 9 microseconds.

In one embodiment, any slot duration in a given time duration is one of the Q time sub-pool(s); the given time duration is any of all defer durations, all additional slot durations, and all additional defer durations comprised in FIG. 8.

In one embodiment, performing an energy detection in a given time duration refers to: performing energy detections in all slot durations in the given time duration; the given time duration is any of all defer durations, all additional slot durations, and all additional defer durations comprised in FIG. 8.

In one embodiment, being determined to be idle at a given time duration by an energy detection refers to: each of slot durations comprised in the given duration is determined to be idle by an energy detection; the given time duration is any of all defer durations, all additional slot durations, and all additional defer durations comprised in FIG. 8.

In one embodiment, being determined to be idle at a given slot duration by an energy detection refers to: the UE senses power of all radio signals in a given time unit on the given sub-band and averages it in time, the received power being lower than the first reference threshold; the given time unit is a duration in the given slot duration;

In one subembodiment of the above embodiment, a duration of the given time unit is not less than 4 microseconds.

In one embodiment, being determined to be idle at a given slot duration by an energy detection refers to: the UE senses energy of all radio signals in a given time unit on the given sub-band and averages it in time, the received energy being lower than the first reference threshold; the given time unit is a duration in the given slot duration;

In one subembodiment of the above embodiment, a duration of the given time unit is not less than 4 microseconds.

In one embodiment, performing an energy detection in a given time duration refers to: performing energy detections in all time sub-pools in the given time duration; the given time duration is any of all defer durations, all additional slot durations, and all additional defer durations comprised in FIG. 8, and the all time sub-pools belong to the Q time sub-pool(s).

In one embodiment, being determined to be idle at a given time duration by an energy detection refers to: each of detection values obtained by energy detections of all time sub-pools comprised in the given time period is lower than the first reference threshold; the given time duration is any of all defer durations, all additional slot durations, and all additional defer durations comprised in FIG. 8; the all time sub-pools belong to the Q time sub-pool(s), and the detection values belong to the Q detection value(s).

In one embodiment, a duration of a defer duration is 16 microseconds plus M1 9 microseconds, the M1 being a positive integer.

In one subembodiment of the above embodiment, a defer duration comprises M1+1 time sub-pools among the Q time sub-pools In one reference embodiment of the above subembodiment, a duration of a first time sub-pool among the M1+1 time sub-pools is 16 microseconds, and a duration of each of the other M1 time sub pool(s) is 9 microseconds.

In one subembodiment of the above embodiment, the given priority class is used for determining the M1.

In one reference embodiment of the above subembodiment, the given priority class is a Channel Access Priority Class, and the definition of the Channel Access Priority Class can be found in 3GPP TS36.213, chapter. 15.

In one subembodiment of the above embodiment, the M1 belongs to 1, 2, 3 and 7.

In one embodiment, a defer duration comprises plurality of slot durations.

In one subembodiment of the above embodiment, a first slot duration and a second slot duration among the plurality of slot durations are non-consecutive.

In one subembodiment of the above embodiment, a time interval between a first slot duration and a second slot duration among the plurality of slot durations is 7 milliseconds.

In one embodiment, a duration of an additional defer duration is 16 microseconds plus M2 9 microseconds, the M2 being a positive integer.

In one subembodiment of the above embodiment, an additional defer duration comprises M2+1 time sub-pools among the Q time sub-pools.

In one reference embodiment of the above subembodiment, a duration of a first time sub-pool among the M2+1 time sub-pools is 26 microseconds, and a duration of each of the other M2 time sub-pool(s) is 9 microseconds.

In one subembodiment of the above embodiment, the given priority class is used for determining the M2.

In one subembodiment of the above embodiment, the M2 belongs to 1, 2, 3 and 7.

In one embodiment, a duration of a defer duration is equal to a duration of an additional defer duration.

In one embodiment, the M1 is equal to the M2.

In one embodiment, an additional defer duration comprises plurality of slot durations.

In one subembodiment of the above embodiment, a first slot duration and a second slot duration among the plurality of slot durations are non-consecutive.

In one subembodiment of the above embodiment, a time interval between a first slot duration and a second slot duration among the plurality of slot durations is 7 milliseconds.

In one embodiment, a duration of a slot duration is 9 microseconds.

In one embodiment, a slot duration is one of the Q time sub-pool(s).

In one embodiment, a duration of an additional slot duration is 9 microseconds.

In one embodiment, an additional slot duration comprises one of the Q time sub-pool(s).

In one embodiment, the Q energy detection(s) is(are) used for determining whether the given sub-band is idle.

In one embodiment, the Q energy detection(s) is(are) used for determining whether the given sub-band can be used by the UE for transmitting the given radio signal.

In one embodiment, each of the Q detection value(s) is measured by dBm.

In one embodiment, each of the Q detection value(s) is measured by mW.

In one embodiment, each of the Q detection value(s) is measured by Joule.

In one embodiment, the Q1 is less than the Q.

In one embodiment, the Q is greater than 1.

In one embodiment, the first reference threshold is measured by dBm.

In one embodiment, the first reference threshold is measured by mW.

In one embodiment, the first reference threshold is measured by Joule.

In one embodiment, the first reference threshold is equal to or less than −72 dBm.

In one embodiment, the first reference threshold is any value equal to or less than a first given value.

In one subembodiment of the above embodiment, the first given value is pre-defined.

In one subembodiment of the above embodiment, the first given value is configured by a higher-layer signaling.

In one embodiment, the first reference threshold is selected by the UE itself under the condition of being equal to or less than a first given value.

In one subembodiment of the above embodiment, the first given value is pre-defined.

In one subembodiment of the above embodiment, the first given value is configured by a higher-layer signaling.

In one embodiment, the Q energy detection(s) is(are) energy detection(s) in Cat 4 LBT process, and the Q1 is a CWp in the Cat 4 LBT process, the CWp is the size of a contention window, the specific meaning of the CWp can be found in 3GPP TS36.213, chapter 15.

In one embodiment, at least one of the Q detection value(s) not belonging to the Q1 detection value(s) is lower than the first reference threshold.

In one embodiment, at least one of the Q detection value(s) not belonging to the Q1 detection value(s) is not lower than the first reference threshold.

In one embodiment, durations of any two of the Q1 time sub-pools are equal.

In one embodiment, there are durations of at least two of the Q1 time sub-pools being unequal.

In one embodiment, the Q1 time sub-pool(s) comprises a latest one among the Q time sub-pool(s).

In one embodiment, the Q1 time sub-pool(s) only comprise(s) a slot duration in eCCA.

In one embodiment, the Q time sub-pool(s) comprises the Q1 time sub-pool(s) and the Q2 time sub-pool(s), and any of the Q2 time sub-pool(s) does not belong to the Q1 time sub-pool(s); the Q2 is a positive integer not greater than the Q minus the Q1.

In one subembodiment of the above embodiment, the Q2 time sub-pool(s) comprise(s) a slot duration in an initial CCA.

In one subembodiment of the above embodiment, positions of the Q2 time sub-pools in the Q time sub-pools are consecutive.

In one subembodiment of the above embodiment, a detection value of at least one of the Q2 time sub-pool(s) is lower than the first reference threshold.

In one subembodiment of the above embodiment, a detection value of at least one of the Q2 time sub-pool(s) is not lower than the first reference threshold.

In one subembodiment of the above embodiment, the Q2 time sub-pool(s) comprise(s) all slot durations among all defer durations.

In one subembodiment of the above embodiment, the Q2 time sub-pool(s) comprise(s) all slot durations among at least one defer duration.

In one subembodiment of the above embodiment, the Q2 time sub-pool(s) comprise(s) at least one additional slot duration.

In one subembodiment of the above embodiment, the Q2 time sub-pool(s) comprise(s) all additional slot durations that are determined to be non-idle by energy detections in FIG. 8 and all slot durations among all additional defer durations.

In one embodiment, the Q1 time sub-pool(s) respectively belong(s) to Q1 sub-pool set(s), and any of the Q1 sub-pool set(s) comprises a positive integer number of time sub-pool(s) among the Q time sub-pool(s); a detection value corresponding to any of the Q1 sub-pool set(s) is lower than the first reference threshold.

In one subembodiment of the above embodiment, a number of time sub-pool comprised in at least one sub-pool set among the Q1 sub-pool set(s) is equal to 1.

In one subembodiment of the above embodiment, a number of time sub-pools comprised in at least one of the Q1 sub-pool set(s) is greater than 1.

In one subembodiment of the above embodiment, a number of time sub-pools comprised in at least two of the Q1 sub-pool sets are unequal.

In one subembodiment of the above embodiment, there does not exist a time sub-pool among the Q time sub-pools simultaneously belongs to two of the Q1 sub-pool sets.

In one subembodiment of the above embodiment, all time sub-pools in any of the Q1 sub-pool set(s) belong to a same additional defer duration or an additional slot duration determined to be idle by energy detections.

In one subembodiment of the above embodiment, at least one detection value corresponding to a time sub-pool among the Q time sub-pool(s) not belonging to the Q1 sub-pool set(s) is lower than the first reference threshold.

In one subembodiment of the above embodiment, at least one detection value corresponding to a time sub-pool among the Q time sub-pool(s) not belonging to the Q1 sub-pool set(s) is not lower than the first reference threshold.

Embodiment 9

Figure 9:
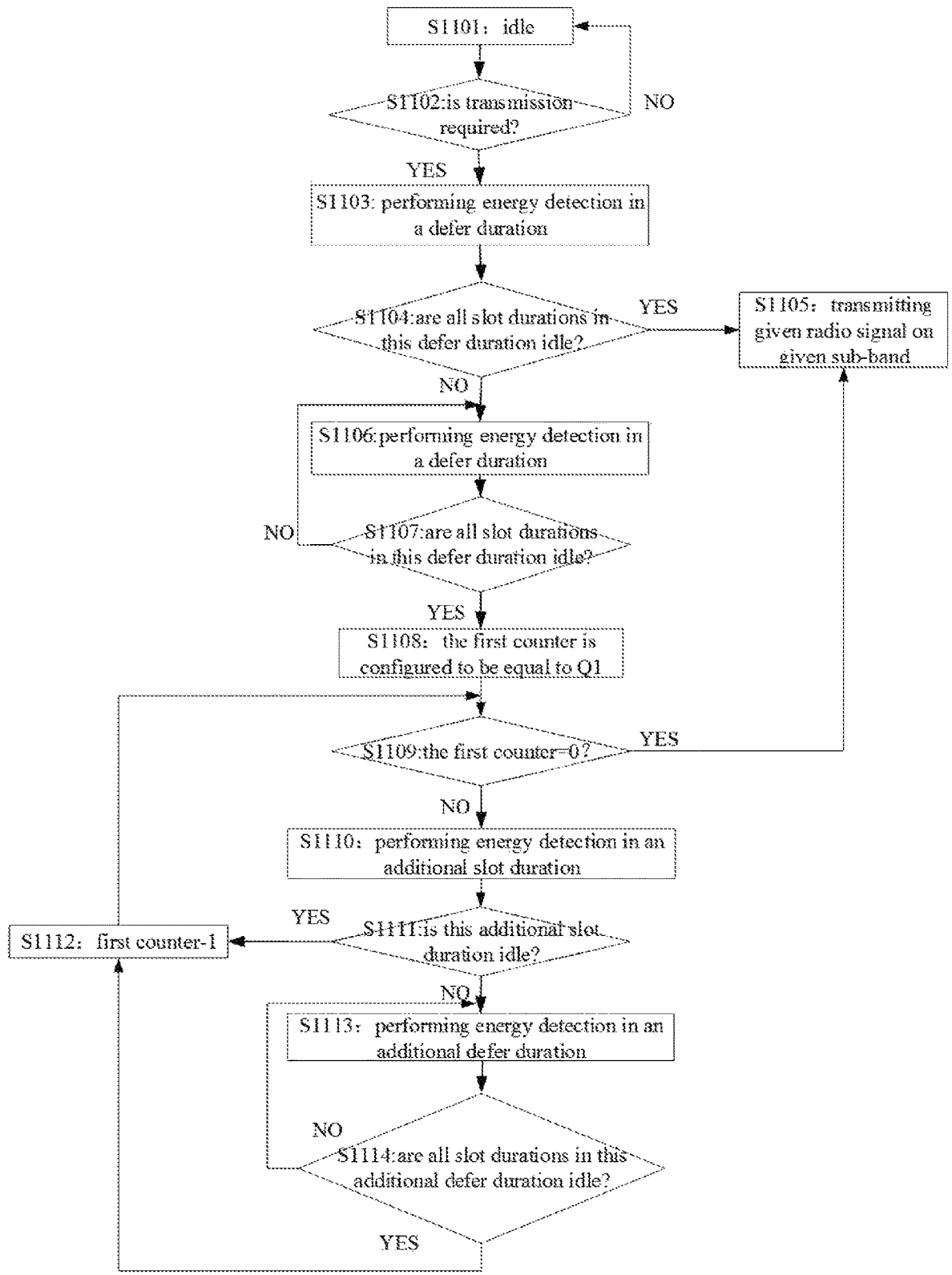
FIG. 9 illustrates a schematic diagram illustrating a given access detection being used for determining whether a given radio signal is transmitted at a given time on a given sub-band according to another embodiment of the present disclosure.
Figure 10A:
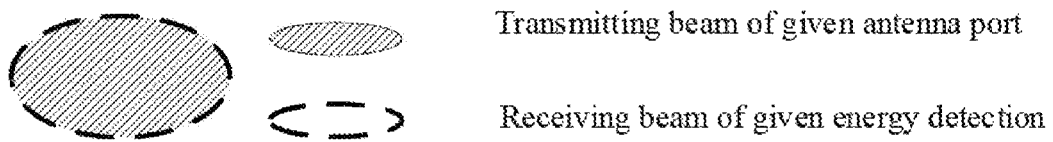
FIGS. 10A-10B respectively illustrate a schematic diagram of a given antenna port being spatially correlated with a given energy detection according to one embodiment of the present disclosure.
Figure 10B:
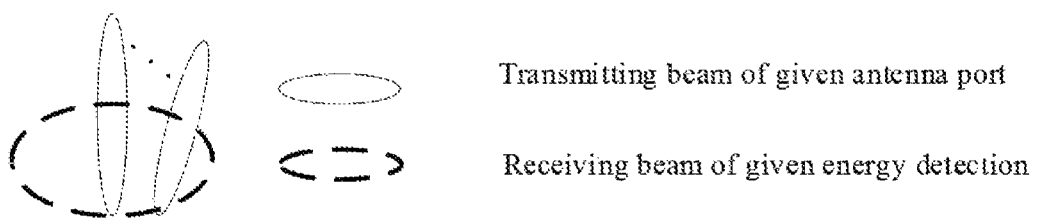

Embodiment 9 illustrates another schematic diagram illustrating a given access detection being used for determining whether a given radio signal is transmitted at a given time on a given sub-band; as shown in FIG. 9.

In Embodiment 9, the given access detection comprises performing the Q energy detection(s) respectively in Q time sub-pool(s) on the given sub-band to obtain Q detection value(s), Q being a positive integer. The given access detection corresponds to the first access detection or any of the first access detection, the given time corresponds to the first time in the present disclosure, and the given radio signal corresponds to the second radio signal in the present disclosure. The process of the given access detection can be illustrated by a flowchart in FIG. 9.

In Embodiment 9, the UE in the present disclosure is idle in step s1101, determines whether a transmission is required in step S1102; performs an energy detection within a defer duration in step S1103; determines whether each of slot durations within this defer duration is idle in step S1104, if so, transmits a radio signal on the first sub-band in the present disclosure in step S1105; otherwise, performs an energy detection within a defer duration in step S1106; determines whether each of slot durations within this defer duration is idle in step S1107, if so, sets a first counter to be equal to Q1 in step S1108; otherwise, returns back to step S1106; determines whether the first counter is 0 in step S1109, if so, transmits a radio signal on the first sub-band in step S1105; otherwise, performs an energy detection within an additional slot duration in step S1110; determines whether the additional slot duration is idle in step S1111, if so, reduces the first counter by 1 in step S1112, and then returns back to step 1109; otherwise, performs an energy detection within an additional defer duration in step S1113; determines whether each of slot durations in the additional defer duration is idle in step S1114, and if so, moves to step S1112; otherwise, returns back to step S1113.

In one embodiment, the Q1 is equal to 0, the UE determines that all slot durations within the defer duration are idle in the step S1104 or the step S1108, the result of the given access detection is that the channel is idle, and the given radio signal can be transmitted at the given time; otherwise, the given radio signal cannot be transmitted at the given time.

In one embodiment, the Q1 is not less than 0, and the UE determines that not all slot durations within this defer duration are idle in step S1104. The first counter in FIG. 9 is reset before the given time, the result of the given access detection is that the channel is idle, and the given radio signal can be transmitted at the given time; otherwise, the given radio signal cannot be transmitted at the given time. A condition for resetting the first counter is that Q1 detection value(s) among the Q detection value(s) corresponding to Q1 time sub-pool(s) among the Q time sub-pool(s) is(are) lower than a first reference threshold in Embodiment 8, and a start time of the Q1 time sub-pool(s) is after step S1108 in FIG. 9.

Embodiment 10

Embodiment 10A to Embodiment 10B illustrate schematic diagrams of a given antenna port being spatially correlated with a given energy detection respectively.

In Embodiment 10, the given energy detection corresponds to any energy detection in the first access detection in the present disclosure or any energy detection in any of the first access detection, the given antenna port corresponds to any antenna port in the second antenna port group in the present disclosure.

In one embodiment, the phrase that a given antenna port and a given energy detection is spatially correlated refers to: a multi-antenna relevant reception used by the given energy detection can be used for inferring a multi-antenna relevant transmission of the given antenna port, or a multi-antenna relevant transmission of the given antenna port can be used for inferring a multi-antenna relevant reception used by the given energy detection.

In one embodiment, the phrase that a given antenna port and a given energy detection is spatially correlated refers to: a multi-antenna relevant reception used by the given energy detection is the same as a multi-antenna relevant transmission of the given antenna port.

In one embodiment, the phrase that a given antenna port and a given energy detection is spatially correlated refers to: a multi-antenna relevant reception used by the given energy detection comprises a multi-antenna relevant transmission of the given antenna port.

In one embodiment, the phrase that a given antenna port and a given energy detection is spatially correlated refers to: a beam width corresponding to a receiving beamforming matrix used by the given energy detection is not less than that corresponding to a transmitting beamforming matrix of the given antenna port.

In one embodiment, the phrase that a given antenna port and a given energy detection is spatially correlated refers to: a beam direction corresponding to a receiving beamforming matrix used by the given energy detection comprises a beam direction corresponding to a transmitting beamforming matrix of the given antenna port.

In one embodiment, the phrase that a given antenna port and a given energy detection is spatially correlated refers to: a beam width corresponding to a receiving beam used by the given energy detection is greater than that corresponding to a transmitting beam of the given antenna port.

In one embodiment, the phrase that a given antenna port and a given energy detection is spatially correlated refers to: a receiving beam used for the given energy detection comprises a transmitting beam of the given antenna port.

In one embodiment, the phrase that a given antenna port and a given energy detection is not spatially correlated refers to: a multi-antenna relevant reception used by the given energy detection cannot be used for inferring a multi-antenna relevant transmission of the given antenna port, or a multi-antenna relevant transmission of the given antenna port cannot be used for inferring a multi-antenna relevant reception used by the given energy detection.

In one embodiment, the phrase that a given antenna port and a given energy detection is not spatially correlated refers to: a multi-antenna relevant reception used by the given energy detection is different from a multi-antenna relevant transmission of the given antenna port.

In one embodiment, the phrase that a given antenna port and a given energy detection is not spatially correlated refers to: a multi-antenna relevant reception used by the given energy detection does not comprise a multi-antenna relevant transmission of a given antenna port.

In one embodiment, the phrase that a given antenna port and a given energy detection is not spatially correlated refers to: a beam width corresponding to a receiving beamforming matrix used by the given energy detection is less than that corresponding to a transmitting beamforming matrix of the given antenna port.

In one embodiment, the phrase that a given antenna port and a given energy detection is not spatially correlated refers to: a beam direction corresponding to a receiving beamforming matrix used by the given energy detection does not comprise a beam direction corresponding to a transmitting beamforming matrix of the given antenna port.

In one embodiment, the phrase that a given antenna port and a given energy detection is not spatially correlated refers to: a beam width corresponding to a receiving beam used by the given energy detection is less than that corresponding to a transmitting beam of the given antenna port.

In one embodiment, the phrase that a given antenna port and a given energy detection is not spatially correlated refers to: a receiving beam used for the given energy detection does not comprise a transmitting beam of the given antenna port.

In one embodiment, the multi-antenna relevant reception refers to Spatial Rx parameters.

In one embodiment, the multi-antenna relevant reception refers to a receiving beam.

In one embodiment, the multi-antenna relevant reception refers to a receiving beamforming matrix.

In one embodiment, the multi-antenna relevant reception refers to a receiving analog beamforming matrix.

In one embodiment, the multi-antenna relevant reception refers to a receiving analog beamforming vector.

In one embodiment, the multi-antenna relevant reception refers to a receiving beamforming vector.

In one embodiment, the multi-antenna relevant reception refers to a receiving spatial filtering.

In one embodiment, the multi-antenna relevant transmission refers to Spatial Tx parameters.

In one embodiment, the multi-antenna relevant transmission refers to a transmitting beam.

In one embodiment, the multi-antenna relevant transmission refers to a transmitting beamforming matrix.

In one embodiment, the multi-antenna relevant transmission refers to a transmitting analog beamforming matrix.

In one embodiment, the multi-antenna relevant transmission refers to a transmitting analog beamforming vector.

In one embodiment, the multi-antenna relevant transmission refers to a transmitting beamforming vector.

In one embodiment, the multi-antenna relevant transmission refers to a transmitting spatial filtering.

In one embodiment, the Spatial Tx parameters include one or more of a transmitting antenna port, a transmitting antenna port set, a transmitting beam, a transmitting analog beamforming matrix, a transmitting analog beamforming vector, a transmitting beamforming matrix, a transmitting beamforming vector and a transmitting spatial filtering.

In one embodiment, the Spatial Tx parameters comprise a transmitting antenna port.

In one embodiment, the Spatial Tx parameters comprise a transmitting antenna port group.

In one embodiment, the Spatial Tx parameters comprise a transmitting beam.

In one embodiment, the Spatial Tx parameters comprise a transmitting analog beamforming matrix.

In one embodiment, the Spatial Tx parameters comprise a transmitting analog beamforming vector.

In one embodiment, the Spatial Tx parameters comprise a transmitting beamforming matrix.

In one embodiment, the Spatial Tx parameters comprise a transmitting beamforming vector.

In one embodiment, the Spatial Tx parameters comprise a transmitting antenna port and a transmitting beam.

In one embodiment, the Spatial Tx parameters comprise a transmitting antenna port and a transmitting analog beamforming matrix.

In one embodiment, the Spatial Tx parameters comprise a transmitting antenna port and a transmitting analog beamforming vector.

In one embodiment, the Spatial Tx parameters comprise a transmitting antenna port and a transmitting beamforming matrix.

In one embodiment, the Spatial Tx parameters comprise a transmitting antenna port and a transmitting beamforming vector.

In one embodiment, the Spatial Tx parameters comprise a transmitting antenna port group and a transmitting beam.

In one embodiment, the Spatial Tx parameters comprise a transmitting antenna port group and a transmitting analog beamforming matrix.

In one embodiment, the Spatial Tx parameters comprise a transmitting antenna port group and a transmitting analog beamforming vector.

In one embodiment, the Spatial Tx parameters comprise a transmitting antenna port group and a transmitting beamforming matrix.

In one embodiment, the Spatial Tx parameters comprise a transmitting antenna port group and a transmitting beamforming vector.

In one embodiment, Spatial Rx parameters includes one or more of a receiving beam, a receiving analog beamforming matrix, a receiving analog beamforming vector, a receiving beamforming matrix, a receiving beamforming vector and receiving spatial filtering.

In one embodiment, the Spatial Rx parameters comprise a receiving beam.

In one embodiment, the Spatial Rx parameters comprise a receiving analog beamforming matrix.

In one embodiment, the Spatial Rx parameters comprise a receiving analog beamforming vector.

In one embodiment, the Spatial Rx parameters comprise a receiving beamforming matrix.

In one embodiment, the Spatial Rx parameters comprise a receiving beamforming vector.

In one embodiment, the Spatial Rx parameters comprise a receiving spatial filtering.

In one embodiment, a number of antennas used by the given energy detection is less than a number of transmitting antennas of the given antenna port.

In one embodiment, a number of antennas used by the given energy detection is greater than 1.

In one embodiment, a number of transmitting antennas of the given antenna port is greater than 1.

In one embodiment, the Embodiment 10A corresponds to a schematic diagram of the given antenna port being spatially correlated with the given energy detection wherein a receiving beam used by the given energy detection is the same with a transmitting beam of the given antenna port.

In one embodiment, the Embodiment 10B corresponds to a schematic diagram of the given antenna port being spatially correlated with the given energy detection wherein a receiving beam used by the given energy detection comprises a transmitting beam of the given antenna port.

Embodiment 11

Figure 11:
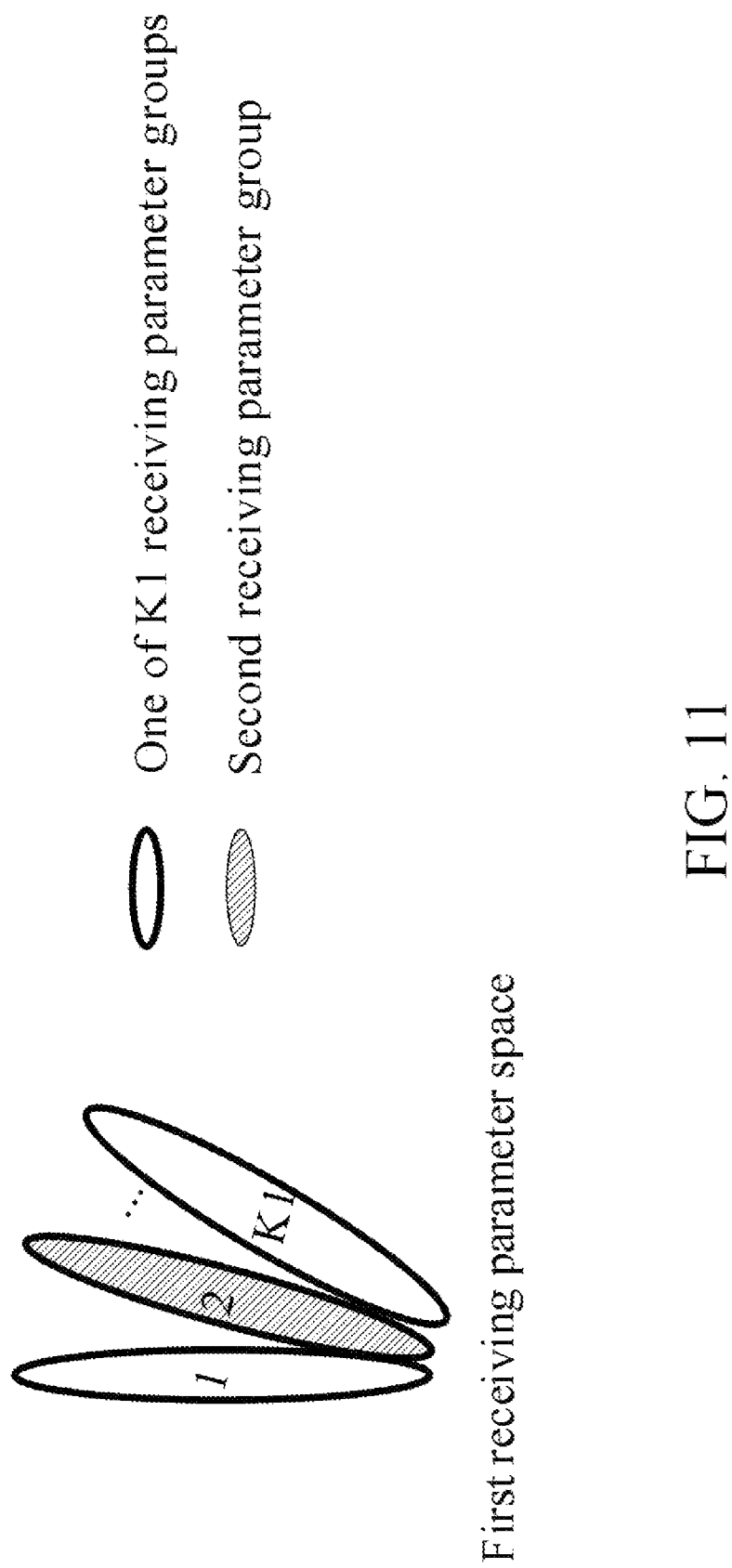
FIG. 11 illustrates a schematic diagram of relationships among a second receiving parameter group, K1 receiving parameter groups and a first receiving parameter space according to one embodiment of the present disclosure.

Embodiment 11 illustrates a schematic diagram of relationships among a second receiving parameter group, K1 receiving parameter groups and a first receiving parameter space, as shown in FIG. 11.

In Embodiment 11, the second receiving parameter group is determined out of the K1 receiving parameter groups, the K1 being a positive integer greater than 1; each of the K1 receiving parameter groups belongs to the first receiving parameter space.

In one embodiment, the second receiving parameter group is a receiving parameter group among the K1 receiving parameter groups whose corresponding access detection result is that the channel is idle.

In one subembodiment of the above embodiment, the first access detection comprises K1 access detections, and the K1 receiving parameter groups are respectively used for the K1 access detections.

In one embodiment, the second receiving parameter group is the only receiving parameter group among the K1 receiving parameter groups whose corresponding access detection result is that the channel is idle.

In one subembodiment of the above embodiment, the first access detection comprises K1 access detections, and the K1 receiving parameter groups are respectively used for the K1 access detections.

In one embodiment, the UE randomly selects one receiving parameter group from K1 receiving parameter groups as the second receiving parameter group.

In one subembodiment of the above embodiment, the first access detection comprises K1 access detections, and the K1 receiving parameter groups are respectively used for the K1 access detections.

In one subembodiment of the above embodiment, the first access detection comprises an access detection, and the K1 receiving parameter groups are used for the first access detection.

In one embodiment, how the UE determines the second receiving parameter group out of K1 receiving parameter groups is a UE implementation issue.

In one subembodiment of the above embodiment, the first access detection comprises K1 access detections, and the K1 receiving parameter groups are respectively used for the K1 access detections.

In one subembodiment of the above embodiment, the first access detection comprises an access detection, and the K1 receiving parameter groups are used for the first access detection.

In one embodiment, the second receiving parameter group is a receiving parameter group among the K1 receiving parameter groups corresponding to a smallest energy detection result.

In one subembodiment of the above embodiment, the first access detection comprises K1 access detections, and the K1 receiving parameter groups are respectively used for the K1 access detections.

In one subembodiment of the above embodiment, the first access detection comprises an access detection, and the K1 receiving parameter groups are used for the first access detection.

In one subembodiment of the above embodiment, the energy detection result corresponds to one access detection.

In one subembodiment of the above embodiment, the energy detection result is an average value of detection value(s) of X energy detection(s) in one access detection, the X being a positive integer.

In one subembodiment of the above embodiment, the energy detection result is sum of detection value(s) of X energy detection(s) in one access detection, the X being a positive integer.

In one subembodiment of the above embodiment, the energy detection result is an average value of largest X detection value(s) among detection values of all energy detections in one access detection, the X being a positive integer.

In one subembodiment of the above embodiment, the energy detection result is a sum of largest X detection value(s) among detection values of all energy detections in one access detection, the X being a positive integer.

In one subembodiment of the above embodiment, the energy detection result is an average value of detection values of all energy detections in one access detection.

In one subembodiment of the above embodiment, the energy detection result is a sum of detection values of all energy detections in one access detection.

Embodiment 12

Embodiment 12 illustrates a schematic diagram of first information, as shown in FIG. 12.

In Embodiment 12, the first information is used for determining the first antenna port group and K1−1 antenna port group(s) in the K antenna port groups in the present disclosure, and K1−1 receiving parameter group(s) among the K1 receiving parameter group in the present disclosure other than the first receiving parameter group is(are) respectively used for reception of radio signal(s) transmitted on the K1−1 antenna port group(s).

In one embodiment, the first information explicitly indicates the first antenna port group and K1−1 antenna port group (s) among the K antenna port groups.

In one embodiment, the first information implicitly indicates the first antenna port group and K1−1 antenna port group(s) among the K antenna port groups.

In one subembodiment of the above embodiment, the first information comprises the first antenna port group and an index(indexes) of K1−1 antenna port group(s) among the K antenna port groups in a given antenna port group set, the given antenna port group set being configured by a higher-layer signaling.

In one subembodiment of the above embodiment, the first information comprises an index of the first antenna port group in a given antenna port group set and an index (indexes) of K1−1 antenna port group(s) among the K antenna port groups in the K antenna port groups, the given antenna port group set being configured by a higher-layer signaling.

Embodiment 13

Embodiment 13A to Embodiment 13C respectively illustrate another schematic diagram of first information.

In Embodiment 13, the first information is used for determining a first threshold, and the first receiving parameter group and the first threshold are used together for determining the first receiving parameter space.

In one embodiment, the first information explicitly indicates the first threshold.

In one embodiment, the first information implicitly indicates the first threshold.

In one embodiment, the first information is used for determining the first antenna port group and the first threshold.

In one subembodiment of the above embodiment, the first information explicitly indicates the first antenna port group.

In one subembodiment of the above embodiment, the first information implicitly indicates the first antenna port group.

In one subembodiment of the above embodiment, the first information indicates an index of the first antenna port group in a given antenna port group set, the given antenna port group set being configured by a higher-layer signaling.

In one subembodiment of the above embodiment, the first information explicitly indicates the first threshold.

In one subembodiment of the above embodiment, the first information implicitly indicates the first threshold.

In one subembodiment of the above embodiment, the first information comprises an index of the first threshold in a given threshold set, the given threshold set being configured by a higher-layer signaling.

In one subembodiment of the above embodiment, the first information comprises an index of the first threshold in a given threshold set, the given threshold set being predefined.

In one embodiment, the first information is used for determining the first antenna port group, the K antenna port groups and the first threshold.

In one subembodiment of the above embodiment, the first information explicitly indicates the first antenna port group.

In one subembodiment of the above embodiment, the first information implicitly indicates the first antenna port group.

In one subembodiment of the above embodiment, the first information explicitly indicates the K antenna port groups.

In one subembodiment of the above embodiment, the first information implicitly indicates the K antenna port groups.

In one subembodiment of the above embodiment, the first information explicitly indicates the first threshold.

In one subembodiment of the above embodiment, the first information implicitly indicates the first threshold.

In one subembodiment of the above embodiment, the first information comprises the first antenna port group and an index of the K antenna port groups in a given antenna port group set, the given antenna port group set being configured by a higher-layer signaling.

In one subembodiment of the above embodiment, the first information also comprises the first threshold.

In one subembodiment of the above embodiment, the first information also comprises an index of the first threshold in a given threshold set, the given threshold set being configured by a higher-layer signaling.

In one subembodiment of the above embodiment, the first information also comprises an index of the first threshold in a given threshold set, the given threshold set being predefined.

In one embodiment, the Embodiment 13A corresponds to a schematic diagram illustrating that the first information indicates the first threshold.

In one embodiment, the Embodiment 13B corresponds to a schematic diagram illustrates that the first information indicates the first antenna port group and the first threshold.

In one embodiment, the Embodiment 13C corresponds to a schematic diagram illustrates that the first information indicates the first antenna port group, the K antenna port groups and the first threshold.

Embodiment 14

Figure 14:
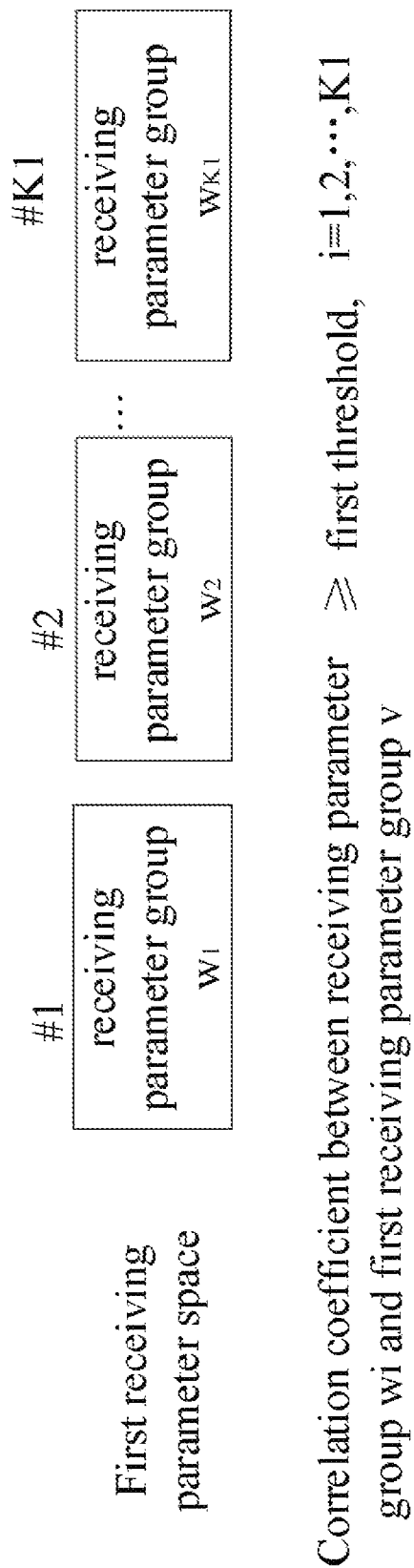
FIG. 14 illustrates a schematic diagram of the determination of the first receiving parameter space according to one embodiment of the present disclosure.

Embodiment 14 illustrates a schematic diagram of determining first receiving parameter space, as shown in FIG. 14.

In Embodiment 14, the first receiving parameter group in the present disclosure and the first threshold in the present disclosure are used together for determining the first receiving parameter space; a correlation coefficient between any receiving parameter group in the first receiving parameter space and the first receiving parameter group is not lower than the first threshold.

In one embodiment, a correlation coefficient between any receiving parameter group in the first receiving parameter space and the first receiving parameter group is greater than the first threshold.

In one embodiment, a given receiving parameter group is a receiving parameter group in the first receiving parameter space, the given receiving parameter group constitutes the first column vector, the first receiving parameter group constitutes the second column vector, and a correlation coefficient between the given receiving parameter group and the first receiving parameter group is an inner product of the first column vector and the second column vector, norms of the first column vector and the second column vector both being equal to 1.

In one embodiment, a given receiving parameter group is a receiving parameter group in the first receiving parameter space, the given receiving parameter group constitutes a column vector w, and the first receiving parameter group constitutes a column vector v, and a correlation coefficient ρ between the given receiving parameter group and the first receiving parameter group meets $$\rho = \frac{|w^H v|}{\|w\| \|v\|}.$$

In one embodiment, a given receiving parameter group is a receiving parameter group in the first receiving parameter space, the given receiving parameter group constitutes a column vector w, and the first receiving parameter group constitutes a column vector v, and a correlation coefficient ρ between the given receiving parameter group and the first receiving parameter group meets $\rho=|w^H v|$, herein, norms of w and v both equal to 1.

In one embodiment, the first threshold is a real number not less than 0 and not greater than 1.

In one embodiment, the first threshold is a real number not less than 0 and less than 1.

Embodiment 15

Figure 15:
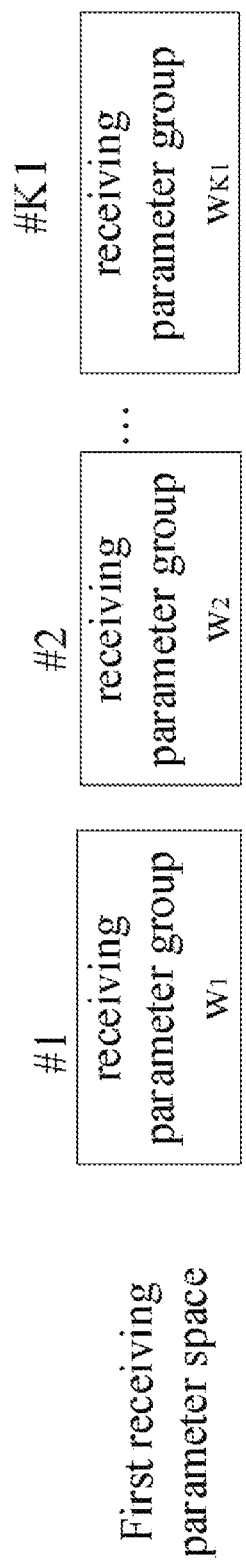
FIG. 15 illustrates a schematic diagram of the determination of the first receiving parameter space according to another embodiment of the present disclosure.

Embodiment 15 illustrates another schematic diagram of determination of the first receiving parameter space, as shown in FIG. 15.

In Embodiment 15, a correlation coefficient between a given receiving parameter group and a transmitting parameter group of the first radio signal in the present disclosure is not lower than the first threshold in the present disclosure, the given receiving parameter group is used for receiving an uplink radio signal transmitted by a given transmitting parameter group, and any receiving parameter group in the first receiving parameter space is used for generating the given transmitting parameter group.

In one embodiment, a correlation coefficient between the given receiving parameter group and a transmitting parameter group of the first radio signal is greater than the first threshold.

In one embodiment, the transmitting parameter group of the first radio signal comprises Spatial Tx parameters.

In one embodiment, the transmitting parameter group of the first radio signal comprises a transmitting beam.

In one embodiment, the transmitting parameter group of the first radio signal comprises a transmitting beamforming matrix.

In one embodiment, the transmitting parameter group of the first radio signal comprises a transmitting analog beamforming matrix.

In one embodiment, the transmitting parameter group of the first radio signal comprises a transmitting beamforming vector.

In one embodiment, the transmitting parameter group of the first radio signal comprises a spatial filtering.

In one embodiment, the given receiving parameter group comprises Spatial Rx parameters.

In one embodiment, the given receiving parameter group comprises a receiving beam.

In one embodiment, the given receiving parameter group comprises a receiving beamforming matrix.

In one embodiment, the given receiving parameter group comprises a receiving analog beamforming matrix.

In one embodiment, the given receiving parameter group comprises a receiving beamforming vector.

In one embodiment, the given receiving parameter group comprise a receiving spatial filtering.

In one embodiment, the given receiving parameter group constitutes a first column vector, and the transmitting parameter group of the first radio signal constitutes a second column vector; a correlation coefficient between the given receiving parameter group and a transmitting parameter group of the first radio signal is an inner product of the first column vector and the second column vector, norms of the first column vector and the second column vector all being equal to 1.

In one embodiment, the given receiving parameter group constitutes a column vector w, the transmitting parameter group of the first radio signal constitutes a column vector v, and a correlation efficient ρ between the given receiving parameter group and a transmitting parameter group of the first radio signal meets $$\rho = \frac{|w^H v|}{\|w\| \|v\|}.$$

In one embodiment, the given receiving parameter group constitutes a column vector w, the transmitting parameter group of the first radio signal constitutes a column vector v, and a correlation efficient ρ between the given receiving parameter group and a transmitting parameter group of the first radio signal meets $\rho=|w^H v|wv$, herein, norms of w and v are equal to 1.

In one embodiment, the phrase that any receiving parameter group in the first receiving parameter space is used for generating the given transmitting parameter group refers to: any receiving parameter group in the first receiving parameter space can be used for inferring the given transmitting parameter group.

In one embodiment, the phrase that any receiving parameter group in the first receiving parameter space is used for generating the given transmitting parameter group refers to: the given transmitting parameter group is the same as any receiving parameter group in the first receiving parameter space.

In one embodiment, the phrase that any receiving parameter group in the first receiving parameter space is used for generating the given transmitting parameter group refers to: any receiving parameter group in the first receiving parameter space comprises the given transmitting parameter group.

In one embodiment, the first threshold is a real number not less than 0 and not greater than 1.

In one embodiment, the first threshold is a real number not less than 0 and less than 1.

Embodiment 16

Figure 16:
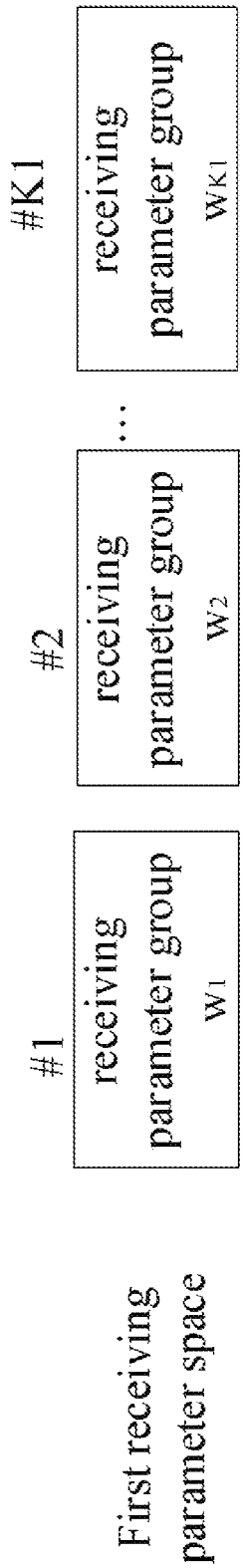
FIG. 16 illustrates a schematic diagram of the determination of the first receiving parameter space according to another embodiment of the present disclosure.

Embodiment 16 illustrates another schematic diagram of determining the first receiving parameter space, as shown in FIG. 16.

In Embodiment 16, a deviation between a first reference receiving quality and a receiving quality obtained by adopting any receiving parameter group in the first receiving parameter space to receive a downlink radio signal is not greater than the first threshold in the present disclosure, the first reference receiving quality being a receiving quality obtained by receiving the downlink radio signal by using the first receiving parameter group in the present disclosure.

In one embodiment, a deviation between the first reference receiving quality and a receiving quality obtained by adopting any receiving parameter group in the first receiving parameter space to receive a downlink radio signal is less than the first threshold.

In one embodiment, a deviation between a first reference receiving quality and a given first receiving quality is a difference value that the first reference receiving quality minus the given first receiving quality, and the given first receiving quality is a receiving quality obtained by adopting one given receiving parameter group in the first receiving parameter space to receive a downlink radio signal.

In one subembodiment of the above embodiment, the first reference receiving quality is not less than the given first receiving quality.

In one subembodiment of the above embodiment, a deviation between the first reference receiving quality and a given first receiving quality is not less than zero.

In one embodiment, a deviation between a first reference receiving quality and a given first receiving quality is an absolute value of a difference value that the first reference receiving quality minus the given first receiving quality, and the given first receiving quality is a receiving quality obtained by adopting one given receiving parameter group in the first receiving parameter space to receive a downlink radio signal.

In one subembodiment of the above embodiment, the first reference receiving quality is not less than the given first receiving quality.

In one subembodiment of the above embodiment, the first reference receiving quality is less than the given first receiving quality.

In one subembodiment of the above embodiment, a deviation between the first reference receiving quality and a given first receiving quality is a value not less than zero.

In one embodiment, a deviation between the first reference receiving quality and a receiving quality obtained by adopting any receiving parameter group in the first receiving parameter space to receive a downlink radio signal is a value not less than zero.

In one embodiment, the first reference receiving quality and a receiving quality obtained by adopting any receiving parameter group in the first receiving parameter space to receive a downlink radio signal both comprise Reference Signals Received Power (RSRP).

In one embodiment, the first reference receiving quality and a receiving quality obtained by adopting any receiving parameter group in the first receiving parameter space to receive a downlink radio signal both comprise a Reference Signals Received Quality (RSRQ).

In one embodiment, the first reference receiving quality and a receiving quality obtained by adopting any receiving parameter group in the first receiving parameter space to receive a downlink radio signal both comprise a Signal-to-Interference-plus-Noise Ratio (SINR).

In one embodiment, the first reference receiving quality and a receiving quality obtained by adopting any receiving parameter group in the first receiving parameter space to receive a downlink radio signal both comprise a Channel quality indicator (CQI).

In one embodiment, the first reference receiving quality and a receiving quality obtained by adopting any receiving parameter group in the first receiving parameter space to receive a downlink radio signal both comprise a Block Error Rate (BLER).

In one embodiment, the first reference receiving quality and a receiving quality obtained by adopting any receiving parameter group in the first receiving parameter space to receive a downlink radio signal are both measured by dB.

In one embodiment, the first reference receiving quality and a receiving quality obtained by adopting any receiving parameter group in the first receiving parameter space to receive a downlink radio signal are both measured by dBm.

In one embodiment, the first reference receiving quality and a receiving quality obtained by adopting any receiving parameter group in the first receiving parameter space to receive a downlink radio signal are both measured by mW.

In one embodiment, the first threshold is measured by dB.

In one embodiment, the first threshold is measured by dBm.

In one embodiment, the first threshold is measured by Joule.

In one embodiment, the first threshold is a real number greater than zero.

In one embodiment, the first threshold is a real number not less than zero.

Embodiment 17

Figure 17:
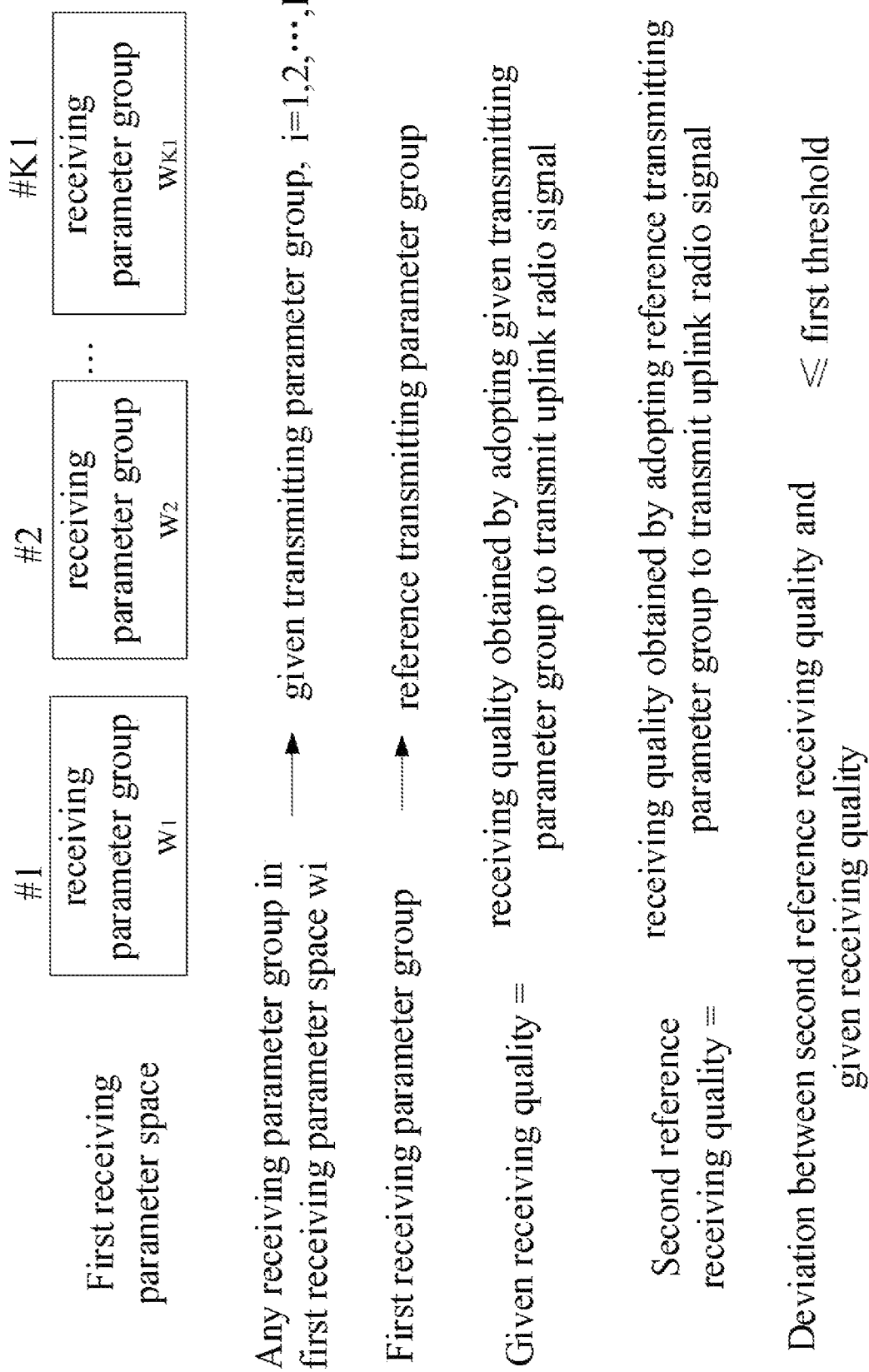
FIG. 17 illustrates a schematic diagram of the determination of the first receiving parameter space according to another embodiment of the present disclosure.

Embodiment 17 illustrates another schematic diagram of determining the first receiving parameter space, as shown in FIG. 17.

In Embodiment 17, a deviation between a second reference receiving quality and a given receiving quality is not greater than the first threshold, the second reference receiving quality is a receiving quality obtained by adopting a reference transmitting parameter group to transmit an uplink radio signal, and the given receiving quality is a receiving quality obtained by adopting a given transmitting parameter group to transmit the uplink radio signal; the first receiving parameter group in the present disclosure is used for generating the reference transmitting parameter group, and any receiving parameter group in the first receiving parameter space is used for generating the given transmitting parameter group.

In one embodiment, a deviation between the second reference receiving quality and a given receiving quality is less than the first threshold.

In one embodiment, a deviation between a second reference receiving quality and a given receiving quality is a difference value that the second reference receiving quality minus the given receiving quality.

In one subembodiment of the above embodiment, the second reference receiving quality is not less than the receiving quality.

In one subembodiment of the above embodiment, a deviation between the second reference receiving quality and a given receiving quality is not less than zero.

In one embodiment, a deviation between a second reference receiving quality and a given receiving quality is an absolute value of a difference value that the second reference receiving quality minus the given receiving quality.

In one subembodiment of the above embodiment, the second reference receiving quality is not less than the given receiving quality.

In one subembodiment of the above embodiment, the second reference receiving quality is less than the given receiving quality.

In one subembodiment of the above embodiment, a deviation between the second reference receiving quality and a given receiving quality is not less than zero.

In one embodiment, a deviation between the second reference receiving quality and a given receiving quality is not less than zero.

In one embodiment, the phrase that the first receiving parameter group is used for generating the reference transmitting parameter group refers to: the first receiving parameter group can be used for inferring the reference transmitting parameter group.

In one embodiment, the phrase that the first receiving parameter group is used for generating the reference transmitting parameter group refers to: the reference transmitting parameter group is the same as the first receiving parameter group.

In one embodiment, the phrase that the first receiving parameter group is used for generating the reference transmitting parameter group refers to: the first receiving parameter group comprises the reference transmitting parameter group.

In one embodiment, the reference transmitting parameter group comprises Spatial Tx parameters.

In one embodiment, the reference transmitting parameter group comprises a transmitting beam.

In one embodiment, the reference transmitting parameter group comprises a transmitting beamforming matrix.

In one embodiment, the reference transmitting parameter group comprises a transmitting analog beamforming matrix.

In one embodiment, the reference transmitting parameter group comprises a transmitting beamforming vector.

In one embodiment, the reference transmitting parameter group comprises a transmitting spatial filtering.

In one embodiment, the given transmitting parameter group comprises Spatial Tx parameters.

In one embodiment, the given transmitting parameter group comprises a transmitting beam.

In one embodiment, the given transmitting parameter group comprises a transmitting beamforming matrix.

In one embodiment, the given transmitting parameter group comprises a transmitting analog beamforming matrix.

In one embodiment, the given transmitting parameter group comprises a transmitting beamforming vector.

In one embodiment, the given transmitting parameter group comprises a transmitting spatial filtering.

In one embodiment, the second reference receiving quality and the given receiving quality both comprise RSRP.

In one embodiment, the second reference receiving quality and the given receiving quality both comprise a RSRQ.

In one embodiment, the second reference receiving quality and the given receiving quality both comprise a SINR.

In one embodiment, the second reference receiving quality and the given receiving quality both comprise a CQI.

In one embodiment, the second reference receiving quality and the given receiving quality both comprise a BLER.

In one embodiment, the first threshold is measured by dB.

In one embodiment, the first threshold is measured by dBm.

In one embodiment, the first threshold is measured by Joule.

In one embodiment, the first threshold is a real number greater than zero.

In one embodiment, the first threshold is a real number not less than zero.

Embodiment 18

Figure 18:
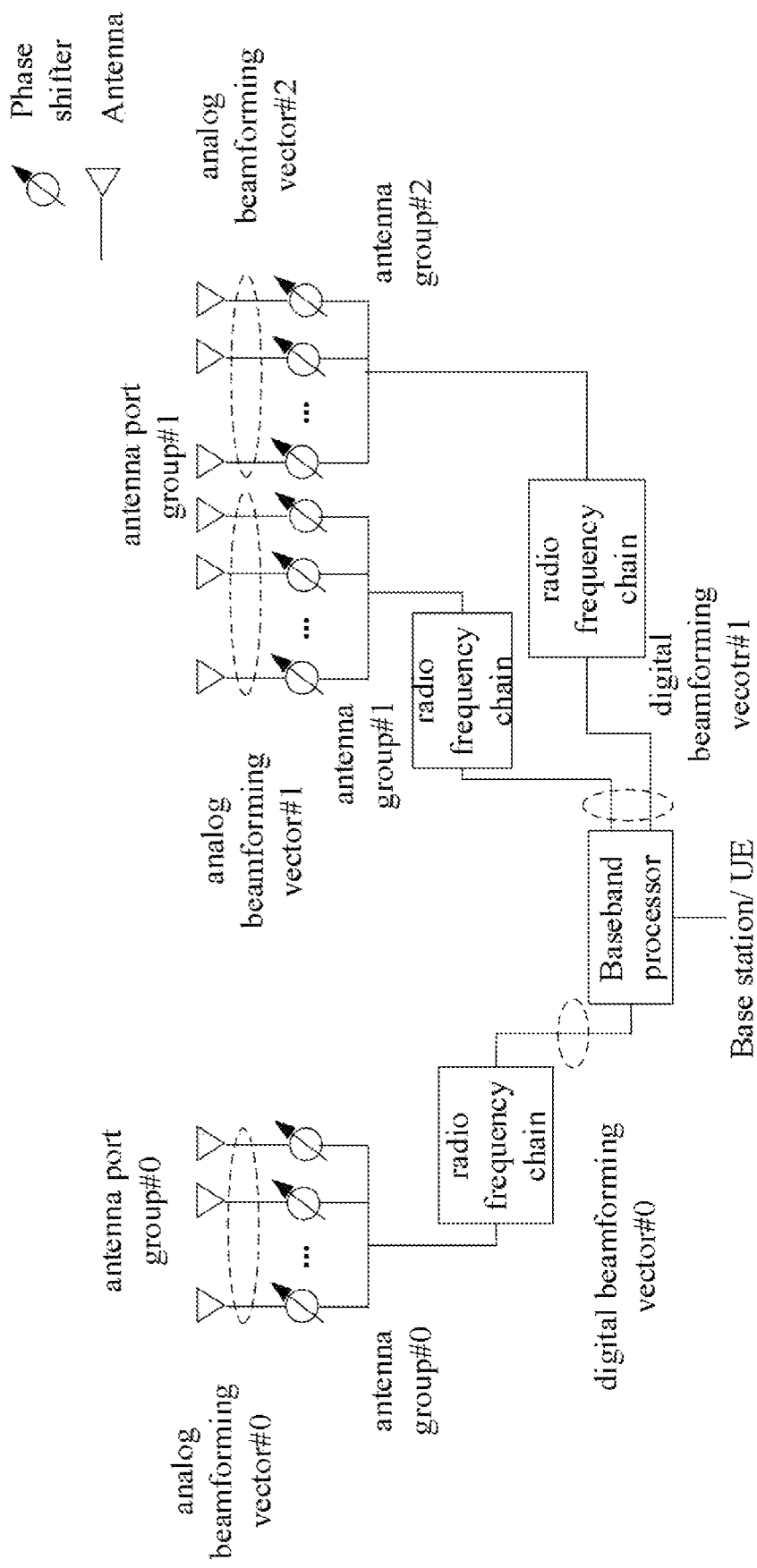
FIG. 18 illustrates a schematic diagram of antenna ports and antenna port groups according to one embodiment of the present disclosure.

Embodiment 18 illustrates a schematic diagram of an antenna port and an antenna port group, as shown in FIG. 18.

In Embodiment 18, an antenna port group comprises a positive integer number of antenna port(s); one antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute a beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) are arranged diagonally to form an analog beamforming matrix corresponding to the given antenna port. Mapping coefficients from the positive integer number of antenna group(s) to the given antenna port constitute a digital beamforming vector corresponding to the given antenna port. A beamforming vector corresponding to the given antenna port is acquired as a product of the analog beamforming matrix and the digital beamforming vector corresponding to the given antenna port. Different antenna ports in an antenna port group are composed of a same antenna group, and different antenna ports in a same antenna port group correspond to different beamforming vectors.

FIG. 18 illustrates two antenna port groups, namely, antenna port group #0 and antenna port group #1. Herein, the antenna port group #0 consists of antenna group #0, and the antenna port group #1 consists of antenna group #1 and antenna group #2. Mapping coefficients from multiple antennas of the antenna group #0 to the antenna port group #0 constitute an analog beamforming vector #0; and mapping coefficients from the antenna group #0 to the antenna port group #0 constitute a digital beamforming vector #0. Mapping coefficients from multiple antennas of the antenna group #1 and multiple antennas of the antenna group #2 to the antenna port group #1 respectively constitute an analog beamforming vector #1 and an analog beamforming vector #2; and mapping coefficients from the antenna group #1 and the antenna group #2 to the antenna port group #1 constitute a digital beamforming vector #1. A beamforming vector corresponding to any antenna port of the antenna port group #0 is acquired as a product of the analog beamforming vector #0 and the digital beamforming vector #0. A beamforming vector corresponding to any antenna port of the antenna port group #1 is acquired as a product of an analog beamforming matrix formed by the analog beamforming vector #1 and the analog beamforming vector #2 arranged diagonally and the digital beamforming vector #1.

In one embodiment, an antenna port group comprises an antenna port. For example, the antenna port group #0 in FIG. 18 comprises an antenna port.

In one subembodiment of the above embodiment, an analog beamforming matrix corresponding to the one antenna port is subjected to dimensionality reduction to form an analog beamforming vector, and a digital beamforming vector corresponding to the one antenna port is subjected to dimensionality reduction to form a scaler, a beamforming vector corresponding to the one antenna port is equal to an analog beamforming vector corresponding thereto. For example, the digital beamforming vector #0 in FIG. 18 is subjected to dimensionality reduction to form a scaler, and a beamforming vector corresponding to an antenna port of the antenna port group #0 is the analog beamforming vector #0.

In one embodiment, an antenna port group comprises a plurality of antenna ports. For example, the antenna port group #1 in FIG. 18 comprises a plurality of antenna ports.

In one subembodiment of the above embodiment, the plurality of antenna ports correspond to a same analog beamforming matrix.

In one subembodiment of the above embodiment, at least two of the plurality of antenna ports correspond to a same analog beamforming matrix.

In one subembodiment of the above embodiment, at least two of the plurality of antenna ports correspond to different analog beamforming matrices.

In one subembodiment of the above embodiment, the plurality of antenna ports correspond to different digital beamforming vectors.

In one subembodiment of the above embodiment, at least two of the plurality of antenna ports correspond to a same digital beamforming vector.

In one subembodiment of the above embodiment, at least two of the plurality of antenna ports correspond to different digital beamforming vectors.

In one embodiment, any two antenna ports in different antenna port groups correspond to different analog beamforming matrices.

In one embodiment, at least two antenna ports in different antenna port groups correspond to different analog beamforming matrices.

In one embodiment, at least two antenna ports in different antenna port groups correspond to a same analog beamforming matrix.

In one embodiment, two different antenna ports are Quasi Co-Located (QCL).

In one embodiment, two different antenna port groups are not QCL.

In one embodiment, any two antenna ports of one antenna port group are QCL.

In one embodiment, any two antenna ports of one antenna port group are not QCL.

In one embodiment, at least two antenna ports of one antenna port group are QCL.

In one embodiment, at least two antenna ports of one antenna port group are not QCL.

In one embodiment, any two antenna ports of one antenna port group are spatial QCL.

In one embodiment, any two antenna ports of one antenna port group are not spatial QCL.

In one embodiment, at least two antenna ports of one antenna port group are spatial QCL.

In one embodiment, at least two antenna ports of one antenna port group are not spatial QCL.

Embodiment 19

Figure 19:
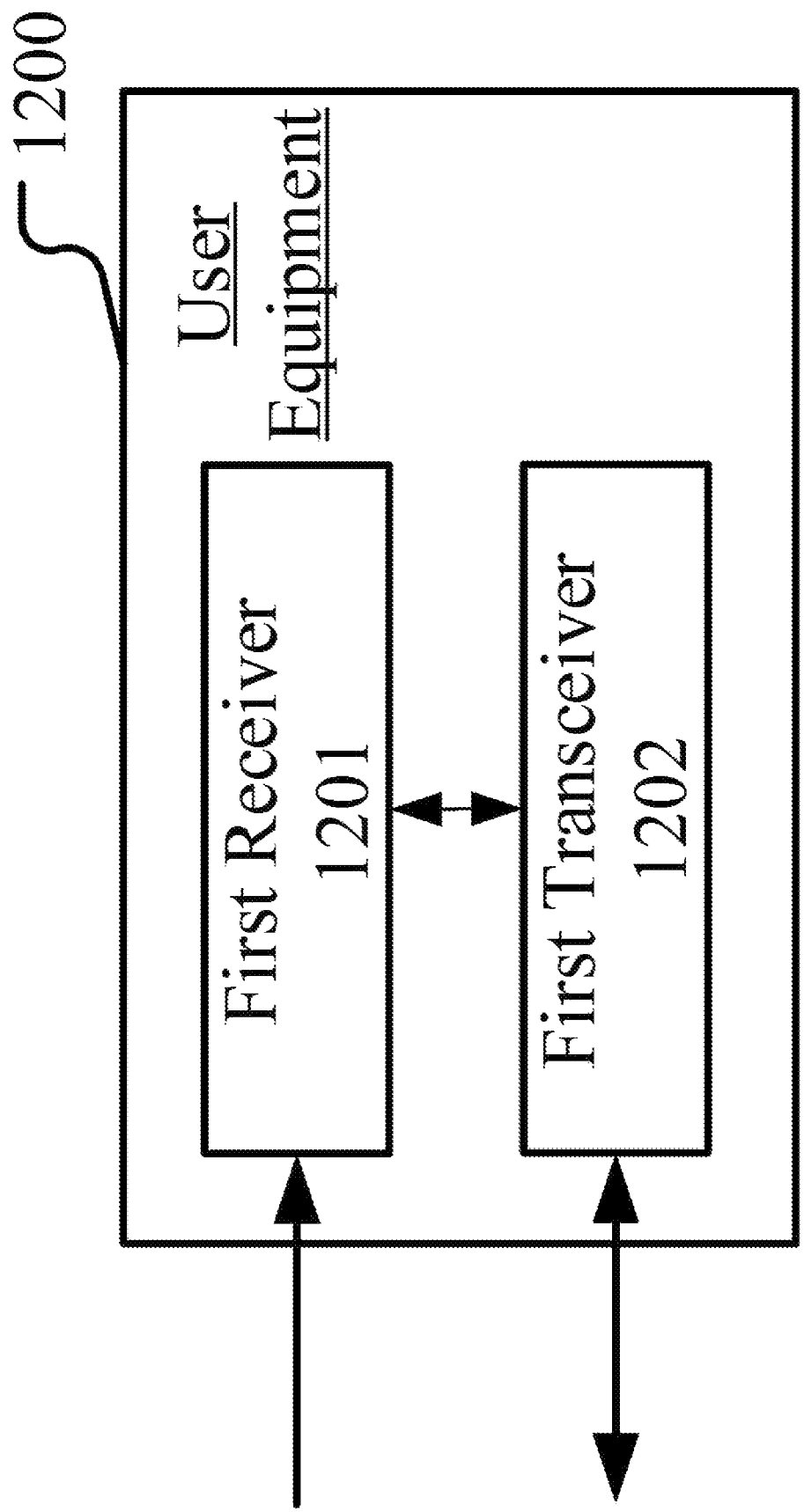
FIG. 19 is a structure block diagram illustrating a processing device in a UE according to one embodiment of the present disclosure.

Embodiment 19 illustrates a structure block diagram of a processing device in a UE, as shown in FIG. 19. In FIG. 19, a UE processing device 1200 consists of a first receiver 1201 and a first transceiver 1202.

In one embodiment, the first receiver 1201 comprises the receiver 456, the receiving processor 452 and the controller/processor 490 in Embodiment 4.

In one embodiment, the first receiver 1201 comprises at least first two of the receiver 456, the receiving processor 452 and the controller/processor 490 in Embodiment 4.

In one embodiment, the first transceiver 1202 comprises the receiver/transmitter 456, the receiving processor 452, the transmitting processor 455 and the controller/processor 490 in Embodiment 4.

In one embodiment, the first transceiver 1202 comprises at least first three of the receiver/transmitter 456, the receiving processor 452, the transmitting processor 455 and the controller/processor 490 in Embodiment 4.

A first receiver 1201: receives a first radio signal, the first radio signal being transmitted by a first antenna port group; receives first information; and a first transceiver 1202: performs a first access detection to determine whether an uplink transmission is performed at a first time on a first sub-band; if so, transmits a second radio signal by a second antenna port group at the first time on the first sub-band; if not, drops transmission of a second radio signal at the first time on the first sub-band.

In Embodiment 19, the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one embodiment, the first transceiver 1202 also determines the second receiving parameter group out of K1 receiving parameter groups, K1 being a positive integer greater than 1. wherein the K1 receiving parameter groups all belong to the first receiving parameter space.

In one embodiment, the first receiver 1201 also receives K radio signals, K being a positive integer greater than 1; wherein the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups.

In one embodiment, in the first receiving parameter space, the UE determines the K1 receiving parameter groups by itself.

In one embodiment, the first information is used for determining a first threshold, and the first receiving parameter group and the first threshold are used together for determining the first receiving parameter space.

In one embodiment, a correlation coefficient between any receiving parameter group in the first receiving parameter space and the first receiving parameter group is not less than the first threshold.

In one embodiment, a deviation between a first reference receiving quality and a receiving quality obtained by adopting any receiving parameter group in the first receiving parameter space to receive a downlink radio signal is not greater than the first threshold, the first reference receiving quality being a receiving quality obtained by adopting the first receiving parameter group to receive the downlink radio signal.

In one embodiment, a deviation between a second reference receiving quality and a given receiving quality is not greater than the first threshold, the second reference receiving quality is a receiving quality obtained by adopting a reference transmitting parameter group to transmit an uplink radio signal, and the given receiving quality is a receiving quality obtained by adopting a given transmitting parameter group to transmit the uplink radio signal; the first receiving parameter group is used for generating the reference transmitting parameter group, and any receiving parameter group in the first receiving parameter space is used for generating the given transmitting parameter group.

Embodiment 20

Figure 20:
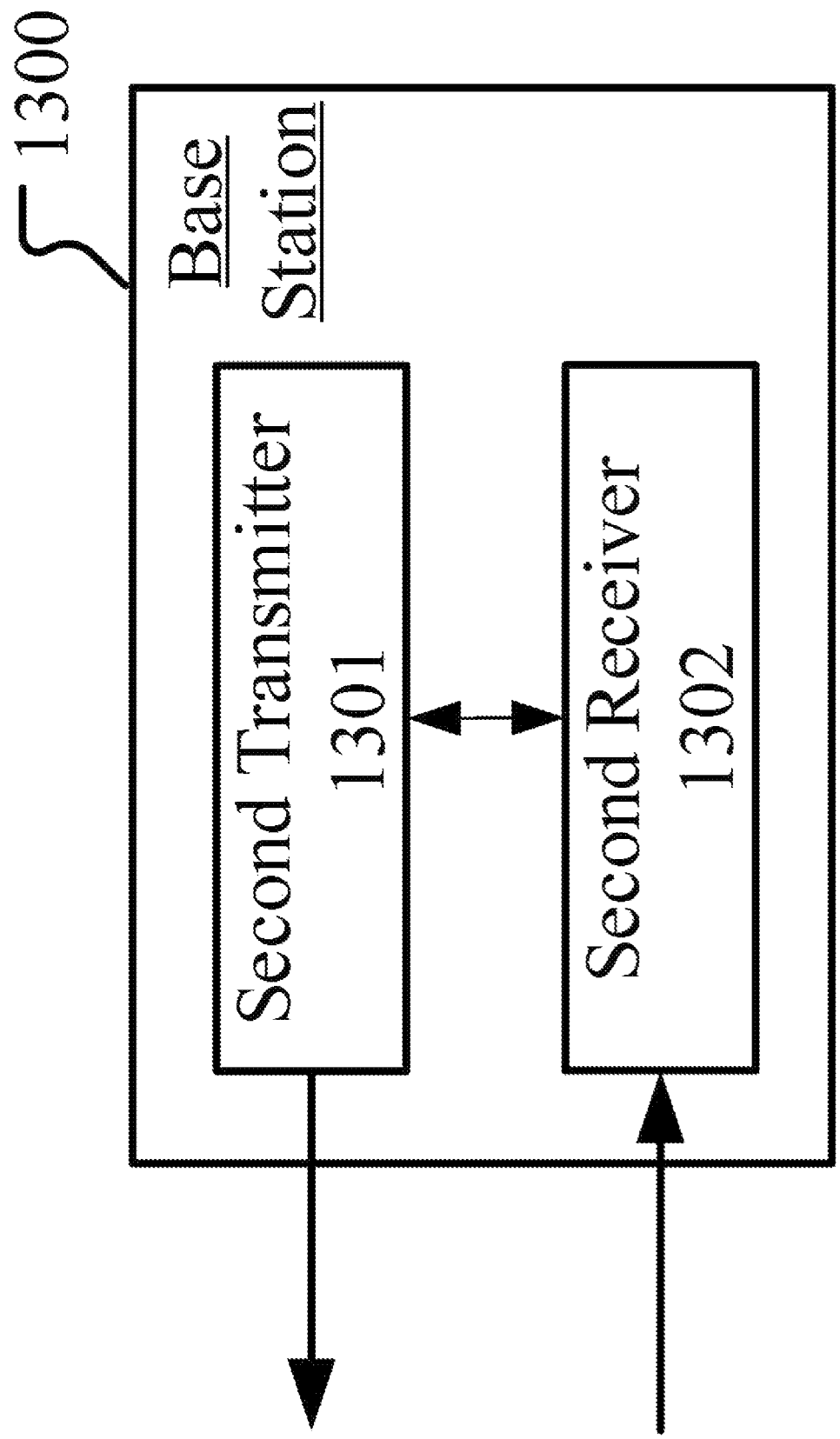
FIG. 20 illustrates a structure block diagram of a processing device in a base station according to one embodiment of the present disclosure.

Embodiment 20 illustrates a structure block diagram of a processing device in a base station, as shown in FIG. 20. In FIG. 20, a processing device 1300 in a base station comprises a second transmitter 1301 and a second receiver 1302.

In one subembodiment, the second transmitter 1301 comprises the transmitter 416, the transmitting processor 415 and the controller/processor 440 in Embodiment 4.

In one subembodiment, the second transmitter 1301 comprises at least the first two of the transmitter 416, the transmitting processor 415 and the controller/processor 440 in Embodiment 4.

In one subembodiment, the second receiver 1302 comprises the receiver 416, the receiving processor 412 and the controller/processor 440 in Embodiment 4.

In one subembodiment, the second receiver 1302 comprises at least the first two of the receiver 416, the receiving processor 412 and the controller/processor 440 in Embodiment 4.

A second transmitter 1301: transmits a first radio signal, the first radio signal being transmitted by a first antenna port group; transmits first information; and a second receiver 1302: monitors a second radio signal at a first time on a first sub-band.

In Embodiment 18, a first access detection is used for determining whether an uplink transmission is performed at the first time on the first sub-band; if so, the second radio signal is transmitted by a second antenna port group at the first time on the first sub-band; if not, transmission of the second radio signal is dropped at the first time on the first sub-band; the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space.

In one embodiment, a transceiver of the first information determines the second receiving parameter group out of K1 receiving parameter groups, K1 being a positive integer greater than 1. wherein the K1 receiving parameter groups all belong to the first receiving parameter space.

In one embodiment, the second transmitter 1301 also transmits K radio signals, K being a positive integer greater than 1; wherein the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups.

In one embodiment, in the first receiving parameter space, a receiver of the first information determines the K1 receiving parameter groups by itself.

In one embodiment, the first information is used for determining a first threshold, and the first receiving parameter group and the first threshold are used together for determining the first receiving parameter space.

In one embodiment, a correlation coefficient between any receiving parameter group in the first receiving parameter space and the first receiving parameter group is not less than the first threshold.

In one embodiment, a deviation between a first reference receiving quality and a receiving quality obtained by adopting any receiving parameter group in the first receiving parameter space to receive a downlink radio signal is not greater than the first threshold, the first reference receiving quality being a receiving quality obtained by adopting the first receiving parameter group to receive the downlink radio signal.

In one embodiment, a deviation between a second reference receiving quality and a given receiving quality is not greater than the first threshold, the second reference receiving quality is a receiving quality obtained by adopting a reference transmitting parameter group to transmit an uplink radio signal, and the given receiving quality is a receiving quality obtained by adopting a given transmitting parameter group to transmit the uplink radio signal; the first receiving parameter group is used for generating the reference transmitting parameter group, and any receiving parameter group in the first receiving parameter space is used for generating the given transmitting parameter group.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in UE for wireless communications, comprising:

receiving a first radio signal, the first radio signal being transmitted by a first antenna port group;

receiving first information; and performing a first access detection to determine whether an uplink transmission is performed at a first time on a first sub-band; if so, transmitting a second radio signal by a second antenna port group at the first time on the first sub-band; if not, dropping transmission of a second radio signal at the first time on the first sub-band;

wherein the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space;

the first information is carried by an RRC signaling, or the first information is carried by a physical-layer signaling;

the first information is used for determining a first threshold, and the first receiving parameter group and the first threshold are used together for determining the first receiving parameter space; a correlation coefficient between any receiving parameter group in the first receiving parameter space and the first receiving parameter group is not lower than the first threshold;

a given receiving parameter group is a receiving parameter group in the first receiving parameter space, the given receiving parameter group constitutes the first column vector, the first receiving parameter group constitutes the second column vector, and a correlation coefficient between the given receiving parameter group and the first receiving parameter group is an inner product of the first column vector and the second column vector, norms of the first column vector and the second column vector both being equal to 1.

2. The method according to claim 1, comprising:

determining the second receiving parameter group out of K1 receiving parameter groups, K1 being a positive integer greater than 1;

wherein each of the K1 receiving parameter groups belongs to the first receiving parameter space.

3. The method according to claim 2, comprising: receiving K radio signals, K being a positive integer greater than 1; herein, the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups;

or, in the first receiving parameter space, the UE determines the K1 receiving parameter groups by itself.

4. A method in a base station for wireless communications, comprising:

transmitting a first radio signal, the first radio signal being transmitted by a first antenna port group;

transmitting first information; and monitoring a second radio signal at a first time on a first sub-band;

wherein a first access detection is used for determining whether an uplink transmission is performed at the first time on the first sub-band; if so, the second radio signal is transmitted by a second antenna port group at the first time on the first sub-band; if not, transmission of the second radio signal is dropped at the first time on the first sub-band; the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space;

the first information is carried by an RRC signaling, or the first information is carried by a physical-layer signaling;

the first information is used for determining a first threshold, and the first receiving parameter group and the first threshold are used together for determining the first receiving parameter space; a correlation coefficient between any receiving parameter group in the first receiving parameter space and the first receiving parameter group is not lower than the first threshold;

a given receiving parameter group is a receiving parameter group in the first receiving parameter space, the given receiving parameter group constitutes the first column vector, the first receiving parameter group constitutes the second column vector, and a correlation coefficient between the given receiving parameter group and the first receiving parameter group is an inner product of the first column vector and the second column vector, norms of the first column vector and the second column vector both being equal to 1.

5. The method according to claim 4, wherein a receiver of the first information determines the second receiving parameter group out of K1 receiving parameter groups, K1 being a positive integer greater than 1; herein, each of the K1 receiving parameter groups belongs to the first receiving parameter space.

6. The method according to claim 5, comprising: transmitting K radio signals, K being a positive integer greater than 1; herein, the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups;

or, in the first receiving parameter space, a receiver of the first information determines the K1 receiving parameter groups by itself.

7. A User Equipment (UE) for wireless communications, comprising:

a first receiver, receiving a first radio signal, the first radio signal being transmitted by a first antenna port group;

receiving first information; and a first transceiver, performing a first access detection for determining whether an uplink transmission is performed at a first time on a first sub-band; if so, transmitting a second radio signal by a second antenna port group at the first time on the first sub-band; if not, dropping transmission of a second radio signal at the first time on the first sub-band;

wherein the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space;

the first information is carried by an RRC signaling, or the first information is carried by a physical-layer signaling;

the first information is used for determining a first threshold, and the first receiving parameter group and the first threshold are used together for determining the first receiving parameter space; a correlation coefficient between any receiving parameter group in the first receiving parameter space and the first receiving parameter group is not lower than the first threshold;

a given receiving parameter group is a receiving parameter group in the first receiving parameter space, the given receiving parameter group constitutes the first column vector, the first receiving parameter group constitutes the second column vector, and a correlation coefficient between the given receiving parameter group and the first receiving parameter group is an inner product of the first column vector and the second column vector, norms of the first column vector and the second column vector both being equal to 1.

8. The UE according to claim 7, wherein the first transceiver also determines the second receiving parameter group out of K1 receiving parameter groups, K1 being a positive integer greater than 1; wherein each of the K1 receiving parameter groups belongs to the first receiving parameter space.

9. The UE according to claim 8, wherein the first receiver also receives K radio signals, K being a positive integer greater than 1; herein, the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups;

or, in the first receiving parameter space, the UE determines the K1 receiving parameter groups by itself.

10. A base station for wireless communications, comprising:

a second transmitter, transmitting a first radio signal, the first radio signal being transmitted by a first antenna port group; transmitting first information; and a second receiver, monitoring a second radio signal at a first time on a first sub-band;

wherein a first access detection is used for determining whether an uplink transmission is performed at the first time on the first sub-band; if so, the second radio signal is transmitted by a second antenna port group at the first time on the first sub-band; if not, transmission of the second radio signal is dropped at the first time on the first sub-band; the first antenna port group comprises a positive integer number of antenna port(s), and the second antenna port group comprises a positive integer number of antenna port(s); a first receiving parameter group is used for receiving the first radio signal, and a second receiving parameter group is used for generating the second antenna port group; the first receiving parameter group and the second receiving parameter group both belong to a first receiving parameter space, and the first information and the first receiving parameter group are used together for determining the first receiving parameter space;

the first information is carried by an RRC signaling, or the first information is carried by a physical-layer signaling;

the first information is used for determining a first threshold, and the first receiving parameter group and the first threshold are used together for determining the first receiving parameter space; a correlation coefficient between any receiving parameter group in the first receiving parameter space and the first receiving parameter group is not lower than the first threshold;

a given receiving parameter group is a receiving parameter group in the first receiving parameter space, the given receiving parameter group constitutes the first column vector, the first receiving parameter group constitutes the second column vector, and a correlation coefficient between the given receiving parameter group and the first receiving parameter group is an inner product of the first column vector and the second column vector, norms of the first column vector and the second column vector both being equal to 1.

11. The base station according to claim 10, wherein a receiver of the first information determines the second receiving parameter group out of K1 receiving parameter groups, K1 being a positive integer greater than 1; herein, each of the K1 receiving parameter groups belongs to the first receiving parameter space.

12. The base station according to claim 11, wherein the second transmitter also transmits K radio signals, K being a positive integer greater than 1; herein, the K radio signals are respectively transmitted by K antenna port groups, and K receiving parameter groups are respectively used for receiving the K radio signals; any receiving parameter group among the K1 receiving parameter groups different from the first receiving parameter group is one of the K receiving parameter groups;

or, in the first receiving parameter space, a receiver of the first information determines the K1 receiving parameter groups by itself.

* * * * *